United States Patent
Mukherjee et al.

(10) Patent No.: US 11,816,566 B2
(45) Date of Patent: Nov. 14, 2023

(54) JOINT LEARNING FROM EXPLICIT AND INFERRED LABELS

(71) Applicant: Microsoft Technology Licensing, LLC, Redmond, WA (US)

(72) Inventors: Subhabrata Mukherjee, Seattle, WA (US); Guoqing Zheng, Redmond, WA (US); Ahmed Awadalla, Redmond, WA (US); Milad Shokouhi, Seattle, WA (US); Susan Theresa Dumais, Kirkland, WA (US); Kai Shu, Mesa, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 16/876,931

(22) Filed: May 18, 2020

(65) Prior Publication Data
US 2021/0357747 A1    Nov. 18, 2021

(51) Int. Cl.
*G06V 10/82* (2022.01)
*G06N 3/08* (2023.01)
*G06N 3/04* (2023.01)

(52) U.S. Cl.
CPC .................. *G06N 3/08* (2013.01); *G06N 3/04* (2013.01); *G06V 10/82* (2022.01)

(58) Field of Classification Search
CPC ...... G06V 10/70; G06V 10/764; G06V 10/82; G06T 2207/20081; G06T 2207/20084; G06N 3/08
See application file for complete search history.

(56) References Cited

U.S. PATENT DOCUMENTS

2011/0112996 A1* 5/2011 Tu et al. ............... G06F 3/038
706/54

OTHER PUBLICATIONS

Yang, et al., "Characterizing and Supporting Question Answering in Human-to-Human Communication", In Proceedings of the 41th Annual International ACM SIGIR Conference on Research and Development in Information Retrieval, Jul. 8, 2018, pp. 345-354.
Zeiler, Matthew D., "Adadelta: An Adaptive Learning Rate Method", In repository of arXiv, arXiv:1212.5701v1, Dec. 22, 2012, 6 Pages.
(Continued)

*Primary Examiner* — Andrew W Johns
(74) *Attorney, Agent, or Firm* — Rainier Patents, P.S.

(57) ABSTRACT

This document relates to training of machine learning models. One example method involves providing a machine learning model having a first classification layer, a second classification layer, and an encoder that feeds into the first classification layer and the second classification layer. The example method also involves obtaining first training examples having explicit labels and second training examples having inferred labels. The inferred labels are based at least on actions associated with the second training examples. The example method also involves training the machine learning model using the first training examples and the second training examples using a training objective that considers first training loss of the first classification layer for the explicit labels and second training loss of the second classification layer for the inferred labels. The method also involves outputting a trained machine learning model having the encoder and the first classification layer.

20 Claims, 11 Drawing Sheets

(56) References Cited

OTHER PUBLICATIONS

Zhang, et al., "Learning from Incomplete and Inaccurate Supervision", In Proceedings of the 25th ACM SIGKDD International Conference on Knowledge Discovery & Data Mining, Aug. 4, 2019, pp. 1017-1025.

Zhang, et al., "Understanding Deep Learning Requires Rethinking Generalization", In repository of arXiv, arXiv:1611.03530v1, Nov. 10, 2016, 14 Pages.

"International Search Report and Written Opinion issued in PCT Application No. PCT/US21/028051", dated Aug. 4, 2021, 14 Pages.

Shu, et al., "Learning with Weak Supervision for Email Intent Detection", In Repository of arXiv:2005.13084v1, May 26, 2020, 10 Pages.

Shu, et al., "Leveraging Multi-Source Weak Social Supervision for Early Detection of Fake News", In Repository of arXiv:2004.01732v1, Apr. 3, 2020, 17 Pages.

"Email Statistics Report", Retrieved From: https://www.radicati.com/wp/wp-content/uploads/2015/02/Email-Statistics-Report-2015-2019-Executive-Summary.pdf, Mar. 2015, 4 Pages.

Agichtein, et al., "Improving Web Search Ranking by Incorporating User Behavior Information", In Proceedings of the 29th Annual International ACM SIGIR Conference on Research and Development in Information Retrieval, Aug. 6, 2006, pp. 19-26.

Al, et al., "Characterizing Email Search Using Large-scale Behavioral Logs and Surveys", In Proceedings of the 26th International Conference on World Wide Web, Apr. 3, 2017, pp. 1511-1520.

Azarbonyad, et al., "Domain Adaptation for Commitment Detection in Email", In Proceedings of the Twelfth ACM International Conference on Web Search and Data Mining, Feb. 11, 2019, pp. 672-680.

Bengio, et al., "Curriculum Learning", In Proceedings of the 26th Annual International Conference on Machine Learning, Jun. 14, 2009, pp. 41-48.

Bennett, et al., "Detecting Action-items in E-mail", Proceedings of the 28th Annual International ACM SIGIR Conference on Research and Development in Information Retrieval, Aug. 15, 2005, pp. 585-586.

Charikar, et al., "Learning from Untrusted Data", In Proceedings of the 49th Annual ACM SIGACT Symposium on Theory of Computing, Jun. 19, 2017, pp. 47-60.

Chui, et al., "The Social Economy: Unlocking Value and Productivity Through Social Technologies", Published by McKinsey Global Institute, Jul. 2012, 184 Pages.

Cohen, Jacob, "A Coefficient of Agreement for Nominal Scales", In Journal of Educational and Psychological Measurement, vol. 20, Issue 1, Apr. 1960, pp. 37-46.

Cohen, et al., "Learning to Classify Email Into Speech Acts", In Proceedings of the Conference on Empirical Methods in Natural Language Processing, Jul. 2004, 8 Pages.

Dabbish, et al., "Understanding Email Use: Predicting Action on a Message", In Proceedings of the Conference on Human Factors in Computing Systems, Apr. 2, 2005, pp. 691-700.

Dehghani, et al., "Neural Ranking Models with Weak Supervision", In Proceedings of the 40th International ACM SIGIR Conference on Research and Development in Information Retrieval, Aug. 7, 2017, pp. 65-74.

Frenay, et al., "Classification in the Presence of Label Noise: a Survey", In Journal of IEEE Transactions on Neural Networks and Learning Systems vol. 25, Issue 5, May 2014, pp. 845-869.

Ge, et al., "Multi-Source Deep Learning for Information Trustworthiness Estimation", In Proceedings of the 19th ACM SIGKDD International Conference on Knowledge Discovery and Data Mining, Aug. 11, 2013, pp. 766-774.

Graves, et al., "Framewise Phoneme Classification with Bidirectional LSTM and other Neural Network Architectures", In Journal of Neural networks, vol. 18, No. 5-6, Jul. 1, 2005, pp. 602-610.

Hassan, et al., "Beyond DCG: User Behavior as a Predictor of a Successful Search", In Proceedings of the third ACM International Conference on Web Search and Data Mining, Feb. 4, 2010, pp. 221-230.

Hendrycks, et al., "Using Trusted Data to Train Deep Networks on Labels Corrupted by Severe Noise", In Proceedings of 32nd Conference on Neural Information Processing Systems, 2018, 10 Pages.

Horvitz, et al., "Attention-Sensitive Alerting", In Proceedings of the Fifteenth Conference on Uncertainty in Artificial Intelligence, Jul. 30, 1999, pp. 305-313.

Horvitz, Eric, "Principles of Mixed-Initiative User Interfaces", In Proceedings of the ACM SIGCHI Conference on Human Factors in Computing Systems, May 15, 1999, pp. 159-166.

Jiang, et al., "Social Contextual Recommendation", In Proceedings of the 21st ACM International Conference on Information and Knowledge Management, Oct. 29, 2012, pp. 45-54.

Joachims, et al., "Evaluating the Accuracy of Implicit Feedback from Clicks and Query Reformulations in Web Search", In Journal of ACM Transactions on Information Systems, vol. 25, Issue 2, Apr. 2007, 27 Pages.

Joachims, et al., "Search Engines that Learn from Implicit Feedback", In Journal of Computer, vol. 40, Issue 8, Aug. 20, 2007, pp. 34-40.

Kannan, et al., "Smart Reply: Automated Response Suggestion for Email", In repository of arXiv, arXiv:1606.04870, Jun. 15, 2016, 10 Pages.

Klimt, et al., "The Enron Corpus: A New Dataset for Email Classification Research", In Proceedings of the 15th European Conference on Machine Learning, Sep. 20, 2004, pp. 217-226.

Kooti, et al., "Evolution of Conversations in the Age of Email Overload", In Proceedings of the 24th International Conference on World Wide Web, May 18, 2015, pp. 603-613.

Kumar, et al., "Self-Paced Learning for Latent Variable Models", In Proceedings of 23rd Annual Conference on Neural Information Processing Systems, Dec. 2010, 9 pages.

Lampert, et al., "Detecting Emails Containing Requests for Action", In Proceedings of The Human Language Technologies: Annual Conference of the North American Chapter of the Association of Computational Linguistics, Jun. 2, 2010, pp. 984-992.

Li, et al., "Learning from Noisy Labels with Distillation", In Proceedings of the IEEE International Conference on Computer Vision, Oct. 22, 2017, pp. 1910-1918.

Lin, et al., "Actionable Email Intent Modeling with Reparametrized RNNs", In Proceedings of Thirty-Second AAAI Conference on Artificial Intelligence, Apr. 26, 2018, pp. 4856-4864.

Luo, et al., "Training Deep Ranking Model with Weak Relevance Labels", In Proceedings of Databases Theory and Applications: 28th Australasian Database Conference, Sep. 25, 2017, 12 Pages.

Mackenzie, et al., "Exploring User Behavior in Email Re-Finding Tasks", In Proceedings of The World Wide Web Conference, May 13, 2019, pp. 1245-1255.

Meng, et al., "Weakly-Supervised Hierarchical Text Classification", In Proceedings of the Thirty-Third AAAI Conference on Artificial Intelligence, Jul. 17, 2019, pp. 6826-6833.

Mitra, et al., "Learning to Match Using Local and Distributed Representations of Text for Web Search", In Proceedings of the 26th International Conference on World Wide Web, Apr. 3, 2017, pp. 1291-1299.

Natarajan, et al., "Learning with Noisy Labels", In Proceedings of 27th Annual Conference on Neural Information Processing Systems, Dec. 5, 2013, 9 pages.

Nettleton, et al., "A Study of the Effect of Different Types of Noise on the Precision of Supervised Learning Techniques", In Journal of Artificial Intelligence Review, vol. 33, Issue 4, Apr. 2010, pp. 275-306.

Oard, et al., "Avocado Research Email Collection", In Proceedings of Linguistic Data Consortium, Feb. 16, 2015, 2 Pages.

Ouyang, et al., "Multi-Source Deep Learning for Human Pose Estimation", In Proceedings of the IEEE Conference on Computer Vision and Pattern Recognition, Jun. 23, 2014, 8 Pages.

(56) References Cited

OTHER PUBLICATIONS

Patrini, et al., "Making Deep Neural Networks Robust to Label Noise: A Loss Correction Approach", In Proceedings of the IEEE Conference on Computer Vision and Pattern Recognition, Jul. 21, 2017, pp. 1944-1952.

Pennington, et al., "Glove: Global Vectors for Word Representation", In Proceedings of Conference on Empirical Methods in Natural Language Processing, Oct. 25, 2014, pp. 1532-1543.

Ratner, et al., "Snorkel: Rapid Training Data Creation with Weak Supervision", In Proceedings of the VLDB Endowment, vol. 11, Issue 3, Nov. 2017, pp. 269-282.

Ratner, et al., "Training Complex Models with Multi-Task Weak Supervision", In repository of arXiv, arXiv:1810.02840, Oct. 5, 2018, 31 Pages.

Reed, et al., "Training Deep Neural Networks on Noisy Labels with Bootstrapping", In repository of arXiv, arXiv:1412.6596, Dec. 20, 2014, 11 Pages.

Ren, et al., "Learning to Reweight Examples for Robust Deep Learning", In repository of arXiv, arXiv:1803.09050, Mar. 24, 2018, 13 Pages.

Sappelli, et al., "Assessing E-mail Intent and Tasks in E-mail Messages", In Journal of Information Sciences, vols. 358, Sep. 2016, 17 Pages.

Sarrafzadeh, et al., "Characterizing and Predicting Email Deferral Behavior", In Proceedings of the Twelfth ACM International Conference on Web Search and Data Mining, Feb. 11, 2019, pp. 627-635.

Sukhbaatar, et al., "Training Convolutional Networks with Noisy Labels", In repository of arXiv, arXiv:1406.2080, Dec. 20, 2014, 11 Pages.

Varma, et al., "Learning Dependency Structures for Weak Supervision Models", In Proceedings of the 36th International Conference on Machine Learning, Jun. 9, 2019, 10 Pages.

Varma, et al., "Snuba: Automating Weak Supervision to Label Training Data", In Proceedings of the VLDB Endowment, vol. 12, Issue 3, Nov. 2018, pp. 223-236.

Wang, et al., "Context-aware Intent Identification in Email Conversations", In Proceedings of the 42nd International ACM SIGIR Conference on Research and Development in Information Retrieval, Jul. 21, 2019, pp. 585-594.

Yang, et al., "Characterizing and Predicting Enterprise Email Reply Behavior", In Proceedings of the 40th International ACM SIGIR Conference on Research and Development in Information Retrieval, Aug. 7, 2017, pp. 235-244.

\* cited by examiner

FIG. 10
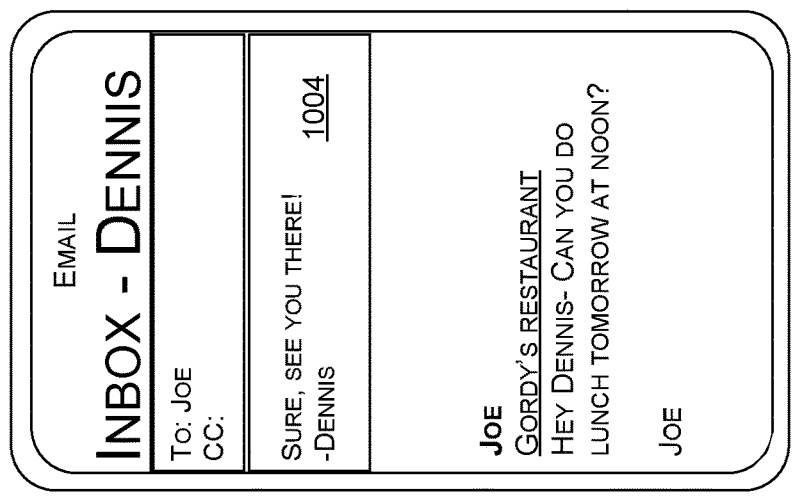
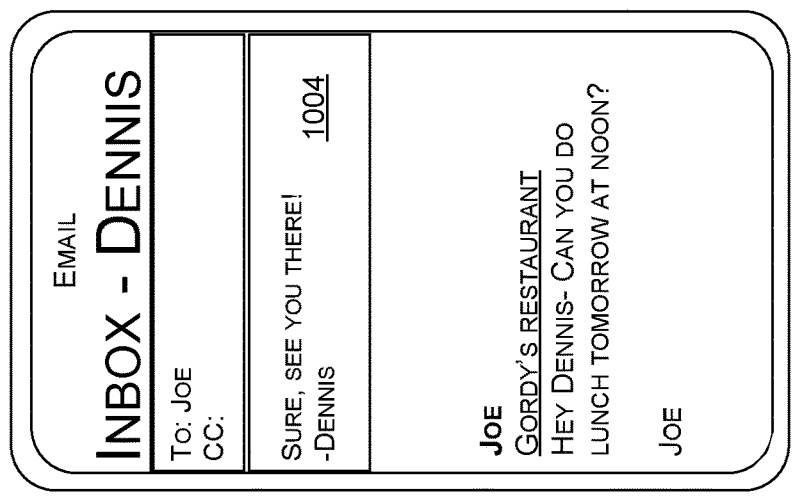
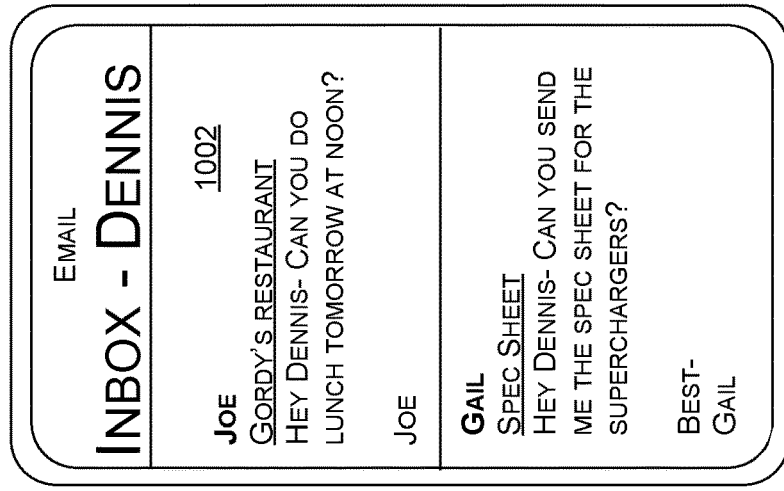

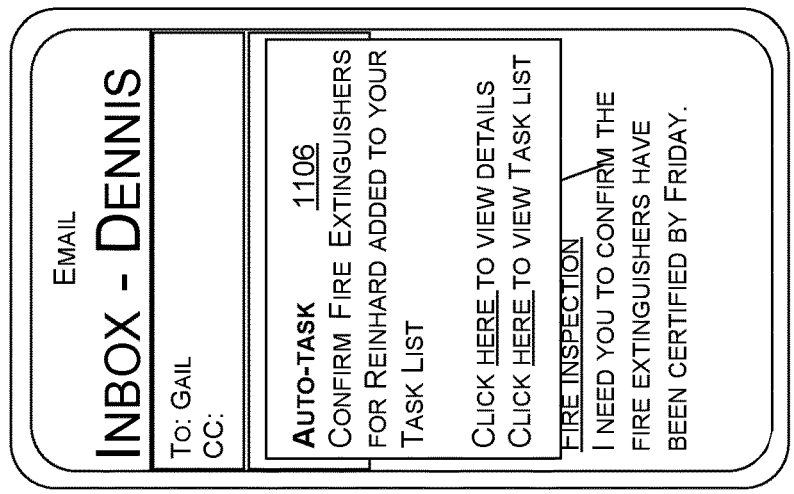
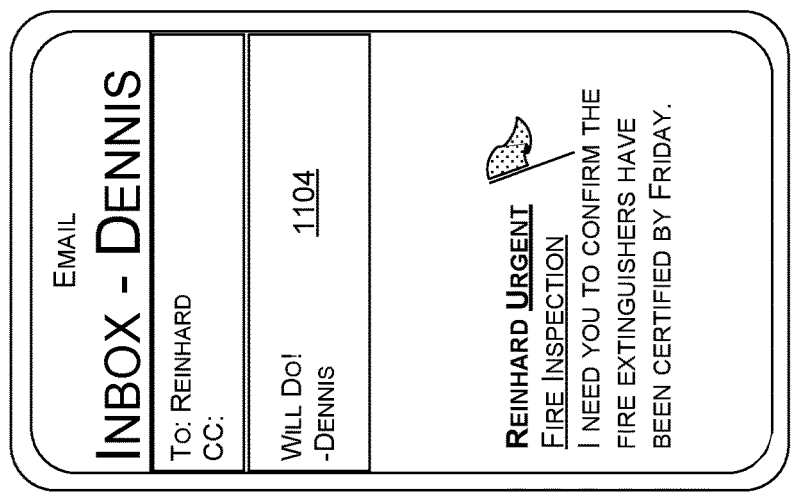
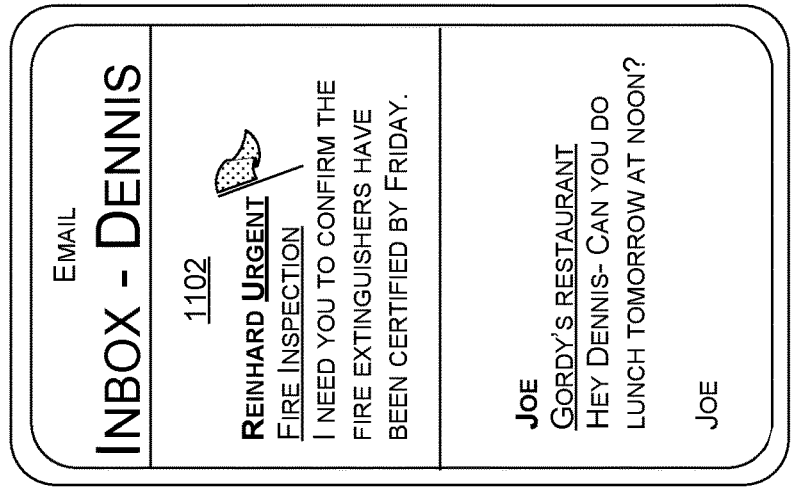
FIG. 11

JOINT LEARNING FROM EXPLICIT AND INFERRED LABELS

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised or semi-supervised learning, training examples can be manually labeled and then used to train a machine learning model. However, for many machine learning tasks, manually-labeled training data may not be readily available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training machine learning models and processing data with machine learning models. One example includes a method or technique that can be performed on a computing device. The method or technique can include providing a machine learning model having a first classification layer, a second classification layer, and an encoder that feeds into the first classification layer and the second classification layer. The method or technique can also include obtaining first training examples that have explicit labels and second training examples that have inferred labels, where the inferred labels are based at least on actions associated with the second training examples. The method or technique can also include training the machine learning model using the first training examples and the second training examples using a training objective. The training objective can reflect first training loss of the first classification layer for the explicit labels and second training loss of the second classification layer for the inferred labels. The method or technique can also include outputting a trained machine learning model having at least the encoder and the first classification layer.

Another example includes a system having a hardware processing unit and a storage resource storing computer-readable instructions. When executed by the hardware processing unit, the computer-readable instructions can cause the hardware processing unit to receive input data and process the input data using a machine learning model having an encoding layer. At least the encoding layer can have been trained to map first training examples having explicit labels and second training examples having inferred labels into a shared vector space. The computer-readable instructions can also cause the hardware processing unit to output the result.

Another example includes a method or technique that can be performed on a computing device. The method or technique can include obtaining first training examples having explicit labels and second training examples having inferred labels. The method or technique can also include initially training a first iteration of a machine learning model using the explicit labels of the first training examples. The method or technique can also include iteratively training subsequent iterations of the machine learning model by: inputting instances of the second training examples into a current iteration of the machine learning model, selecting a batch of the second training examples for a subsequent training iteration based at least on output of the current iteration, and training the subsequent iteration of the machine learning model using individual inferred labels associated with the selected batch of the second training examples. The method or technique can be performed until a final model is obtained.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 9, 10, and 11 illustrate example graphical user interfaces that can be employed for certain user scenarios, consistent with some implementations of the present concepts.

DETAILED DESCRIPTION

Figure 1:
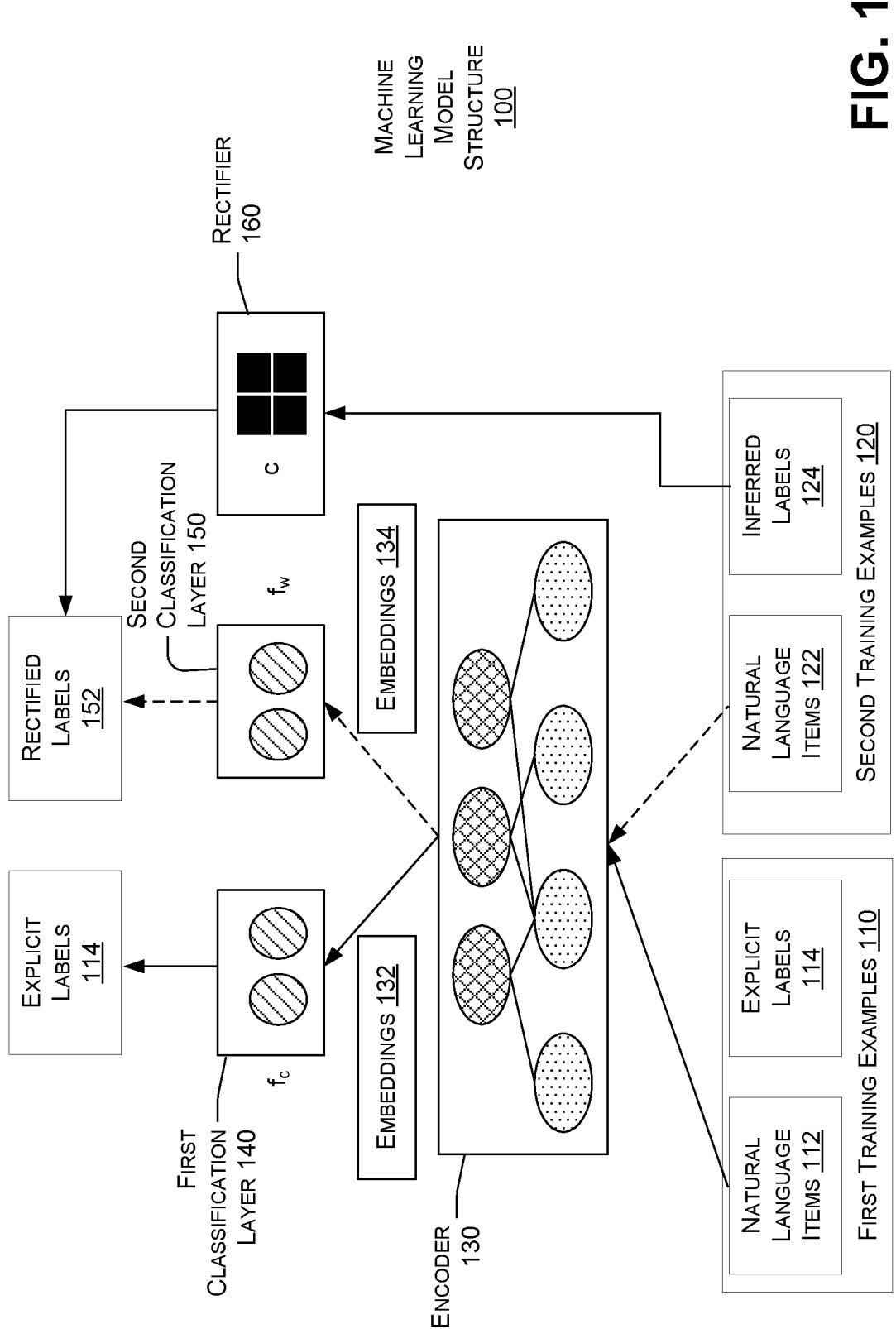
FIG. 1 illustrates an example machine learning model structure that can be used for training, consistent with some implementations of the present concepts.

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include one or more input layers, one or more output layers, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, convolution, embedding, classification, and/or regression operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models trained on different training data or if there are underlying stochastic processes in the training process.

Many machine training algorithms tend to exhibit poor performance (e.g., low accuracy) unless trained with extensive amounts of accurately-labeled training examples. As noted previously, there are many machine learning tasks for which there is a relative lack of manually-labeled training data. In many cases, this is due to the effort required for humans to manually evaluate and label individual training examples, and/or privacy constraints that limit sharing of training data due to sensitive information contained therein.

For some types of machine learning tasks, there may be other sources of evidence, besides manually-labeled examples, that could be used to train a machine learning model. For instance, user actions may provide information about the intent behind a message, e.g., if a user creates a calendar entry after reading an email, this suggests that perhaps the intent of the email was to schedule a meeting. More generally, user actions associated with a given data item can be used to infer the meaning of that data item. However, user actions can be very noisy, e.g., there are many times when an email recipient might create a calendar entry after reading an email when the email did not actually request a meeting with the recipient.

For the purposes of the following discussion, the term "explicit label" refers to a label that is provided by an entity, such as a human or automated agent, that explicitly assigns a labeled value to that training example. For instance, an explicit label could be provided by a person that reads an email and labels the email as having the intent to request information from the recipient. The term "inferred label" refers to a label that is inferred from an action, other than explicit labeling, taken with respect to that training example. For instance, when an email recipient responds to a first email by including an attachment in a second email sent in response to the first email, a rule or heuristic could be employed to infer a particular intent label for the first email, where the inferred intent label indicates the first email intends to request_information from the recipient. Because user actions can be noisy, inferred labels that are based on user actions can also tend to be noisy.

A naive approach for training using a dataset of noisy user actions might involve inferring labels using one or more rules for each item in the dataset, and then training a machine-learning model using only the inferred labels. However, this approach can be problematic because of the underlying noise in the training data, e.g., such a model will tend to be fitted to the noise in the training data. The disclosed implementations can address this problem by training a model with a relatively small amount of explicitly-labeled training examples that have little to no noise, together with a relatively large amount of noisy training examples and corresponding inferred labels. This approach can obtain improved accuracy relative to using only the explicitly-labeled training examples or only the inferred labels obtained from noisy user actions.

For instance, as discussed more below, the disclosed implementations provide a model structure that utilizes an encoder that is configured to map input data into a shared vector space. The encoder feeds into separate classification layers, one of which can be trained using training examples that have explicit labels and the other of which can be trained using other training examples that have inferred labels. The encoder can be trained using both the examples with the explicit labels and the examples with the inferred labels. Furthermore, the disclosed implementations offer a mechanism for prioritizing the order in which training examples with inferred labels are selected for training.

Taken together, the disclosed mechanisms can leverage readily-available noisy user actions to train a machine learning model, while using relatively few explicitly-labeled examples to significantly reduce the impact of noise on the final model. As a consequence, the disclosed implementations can achieve performance comparable to traditional techniques that rely on vast amounts of explicitly-labeled training examples. The following discussion provides some initial examples in a natural language understanding context where a model is trained to perform email intent detection. However, as also discussed further below, the disclosed techniques can also be employed for other types of natural language understanding tasks, as well as to perform tasks for other applications, such as image classification, financial analysis, etc.

Example Training Model Structure

FIG. 1 illustrates an example machine learning model structure 100 that can be trained using the disclosed implementations. Machine learning model structure 100 is one example of a model structure that can be trained to perform one or more natural language processing tasks, as discussed more below. For the purposes of this document, the term "natural language" means language that is normally used by human beings for writing or conversation.

Machine learning model structure 100 can receive first training examples 110 and second training examples 120. The first training examples can include natural language items 112, such as documents, each of which can include words, tokens, sentences, phrases, or other representations of language. The first training examples can also include explicit labels 114, each of which can correspond to a particular natural language item. The second training examples 120 can include natural language items 122, similar to natural language items 112 discussed above. The second training examples can also include inferred labels 124, each of which can correspond to a particular natural language item 122.

In many cases, explicit labels 114 can be provided by some trusted external source, such as a human annotator or trusted automated agent. For classification tasks, the explicit labels can identify a particular training example as belonging to a particular class. For example, the explicit labels can correspond an enumerated set of intents, e.g., a request_information intent, a schedule_meeting intent, and a promise_action intent.

Inferred labels 124 can be obtained based on data indicating that some action has been taken with respect to a particular training example. For instance, a heuristic or rule can map a given action to a corresponding inferred label, based on an assessment that the action tends to imply, but may not affirmatively indicate, that the particular example belongs to a particular class. For instance, as discussed more below, a first rule can state that, when a user attaches a document to a reply email, the email to which they are replying has an inferred label of request_information. A second rule can state that an inferred label of schedule_meeting is applied to an email when the recipient subsequently schedules a meeting with a title that is similar to the subject of the email. A third rule can state that an inferred label of promise_action is applied to any email response to another email that has an associated flag.

During training, both the first training examples 110 and the second training examples 120 can be input to an encoder 130. The encoder can include one or more layers that process natural language items 112 from the first training examples and natural language items 122 from the second training examples. The encoder can produce vectors that represent individual words, tokens, sentences, or phrases in a shared vector space where semantically-similar and/or syntactically-similar words, tokens, sentences, or phrases are relatively close to one another, and less semantically-similar or syntactically-similar words, sentences, tokens, or phrases are relatively further apart. These vectors are also referred to herein as "embeddings."

The encoder 130 can output corresponding embeddings 132 for the natural language items 112 in the first training examples 110 and feed these embeddings into a first classification layer 140. The encoder can output embeddings 134 for the natural language items 122 in the second training examples 120 and feed these embeddings into a second classification layer 150.

The first classification layer 140 can be trained to output the explicit labels 114 for the first training examples 110. The second classification layer 150 can be trained to output rectified labels 152, which are based on the inferred labels 124 for the second training examples 120. The rectified labels can be obtained by inputting the inferred labels 124 into a rectifier 160. The rectifier can convert the inferred labels into the rectified labels, as discussed more below.

Example Prediction Model Structure

Figure 2:
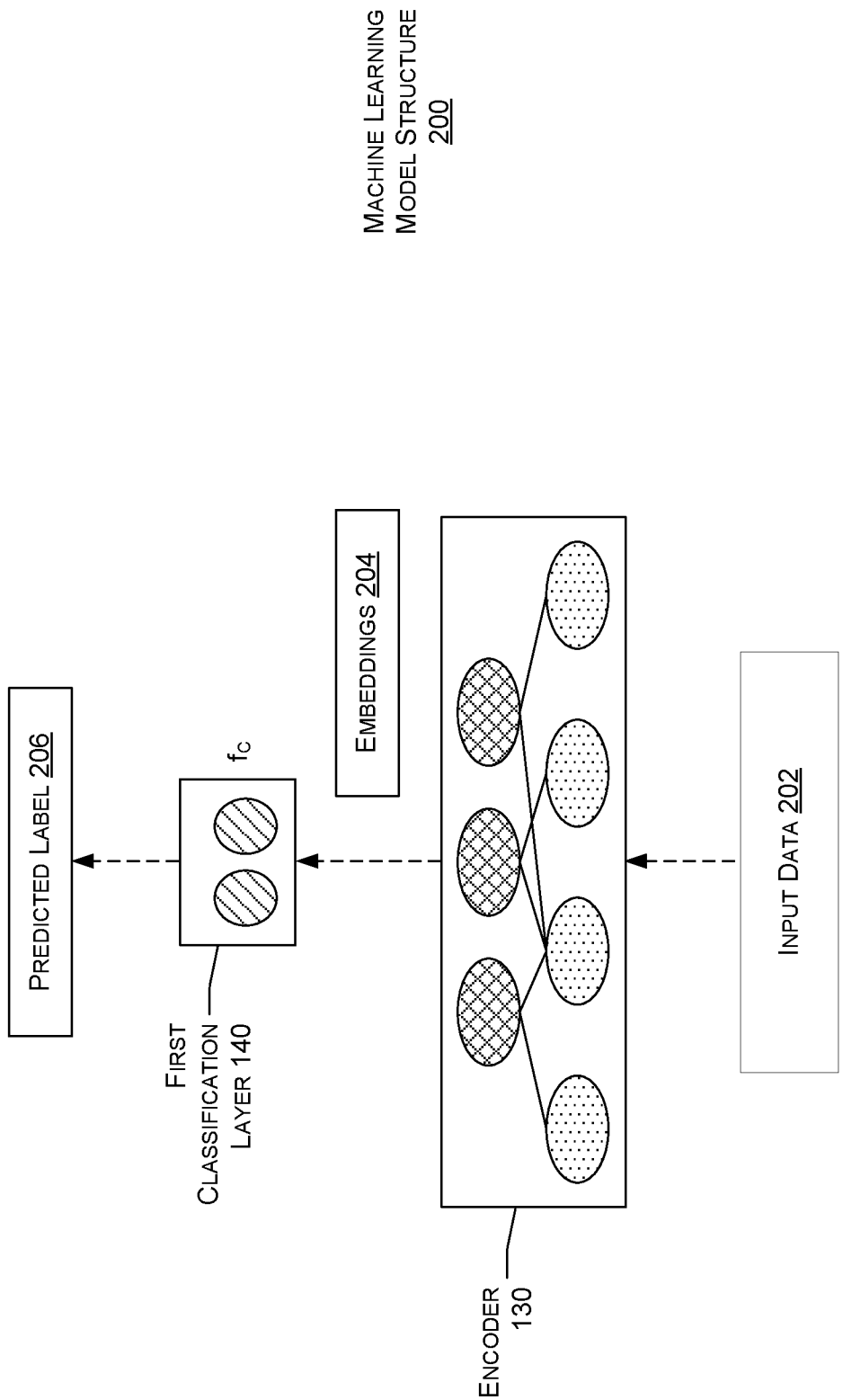
FIG. 2 illustrates an example machine learning model structure that can be used for prediction, consistent with some implementations of the present concepts.

FIG. 2 illustrates an example machine learning model structure 200. Machine learning model structure 200 includes parts of machine learning model structure 100 discussed above with respect to FIG. 1, e.g., encoder 130 and first classification layer 140. In operation, input data 202 is processed by the encoder 130 to produce input data embeddings 204. The input data embeddings are processed by the first classification layer 140 to produce a predicted label 206.

The output of the first classification layer 140 can correspond to a probability distribution of each of the enumerated intents. For instance, a particular input data item might be classified as having a 70% probability of having the request_information intent, a 20% probability of having the schedule_meeting intent, a 15% probability of having the promise_action intent, and a 5% probability of having none of these intents. As discussed more below, automated actions can be taken based on the predicted intents, e.g., when a particular input data item is most likely a request for information, one example automated action facilitates the recipient in providing the requested information to the sender of the email.

Example Training Workflow

Figure 3:
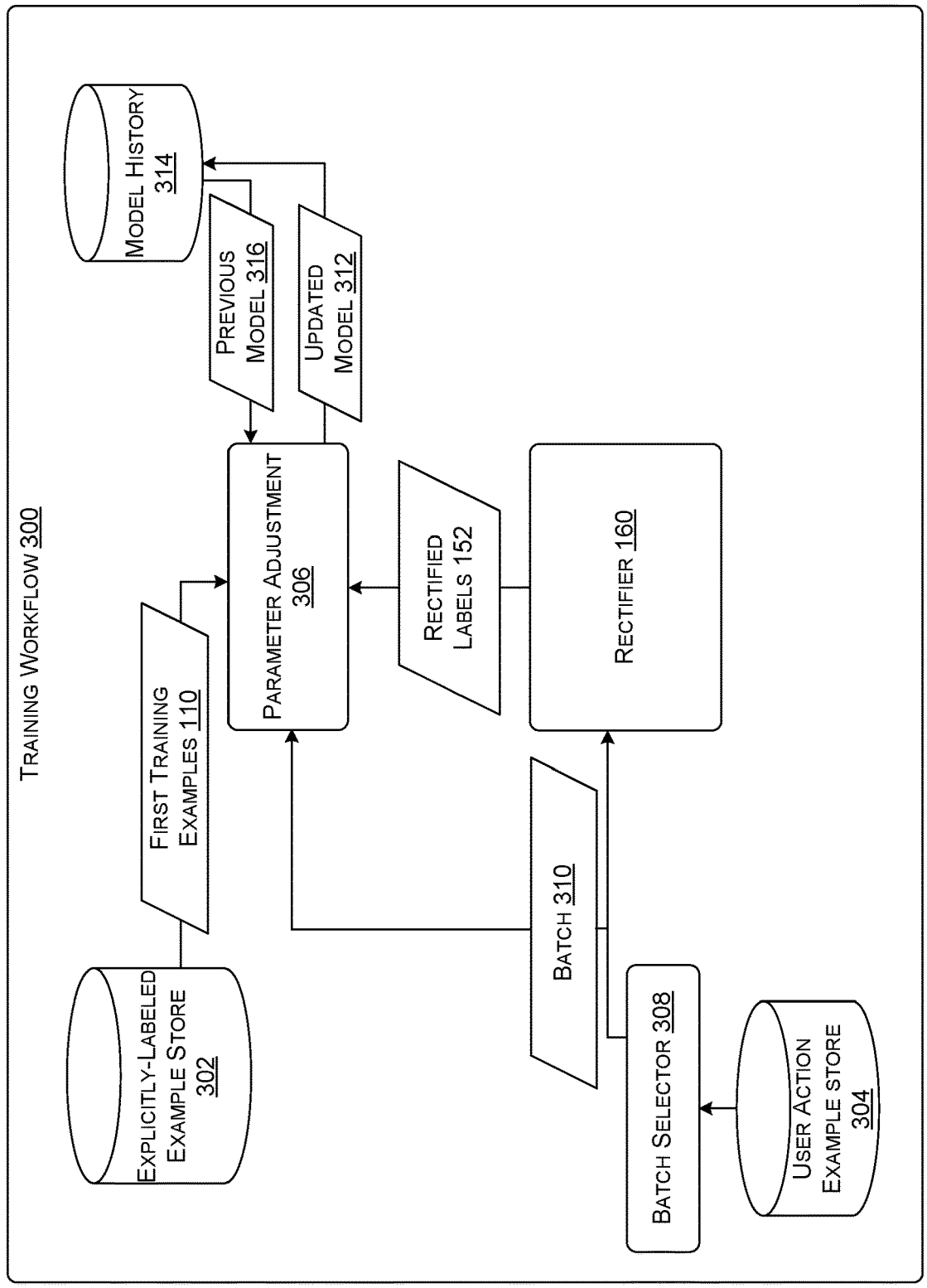
FIG. 3 illustrates an example training workflow for training a machine learning model, consistent with some implementations of the present concepts.

FIG. 3 illustrates an example training workflow 300 for training of a machine learning model, consistent with some implementations. The training workflow is described using the machine learning model structure 100 shown in FIG. 1 as an example, but the training workflow can be performed on many different types of machine learning models.

Training workflow 300 includes data sources such as explicitly-labeled example store 302 and user action example store 304. First training examples 110 from the explicitly-labeled example store can be input to a parameter adjustment process 306, which can adjust parameters of the encoder 130 and first classification layer 140 based on training loss for the explicitly-labeled examples.

Training can proceed iteratively over multiple training iterations. For each iteration, batch selector 308 can select a subset of second training examples from the user action example store 304 and output each subset as a batch 310. As noted above with respect to FIG. 1, each user action can be mapped to a corresponding inferred label, which can be processed by rectifier 160 to obtain rectified labels 152. The parameter adjustment process can adjust parameters of the encoder 130 and the second classification layer 150 based on training loss for the second training examples in each batch.

In each training iteration, the parameter adjustment process 306 can output an updated model 312, which is stored in a model history 314. In the next training iteration, the parameter adjustment process starts with the parameters of the previous model 316 obtained from the model history. As discussed more below, in some implementations, the batch selector can be configured for self-paced learning. In such implementations, one or more initial training iterations can proceed using only explicitly-labeled examples. Once an initial model is trained, subsequent training iterations can be performed using examples with inferred labels. For each of the subsequent training iterations, the batch selector can select the next batch by classifying the second training examples in the user action example store 304 using the previous model 316. Then, the batch selector can select a subset of relatively high-confidence training examples for the next training iteration. In some implementations, the batch selector can also be applied to the first training examples in a similar manner, e.g., by selecting relatively high-confidence labeled examples from the remaining unseen first examples for each of the initial training iterations.

Example Training Data Examples

Figure 4:
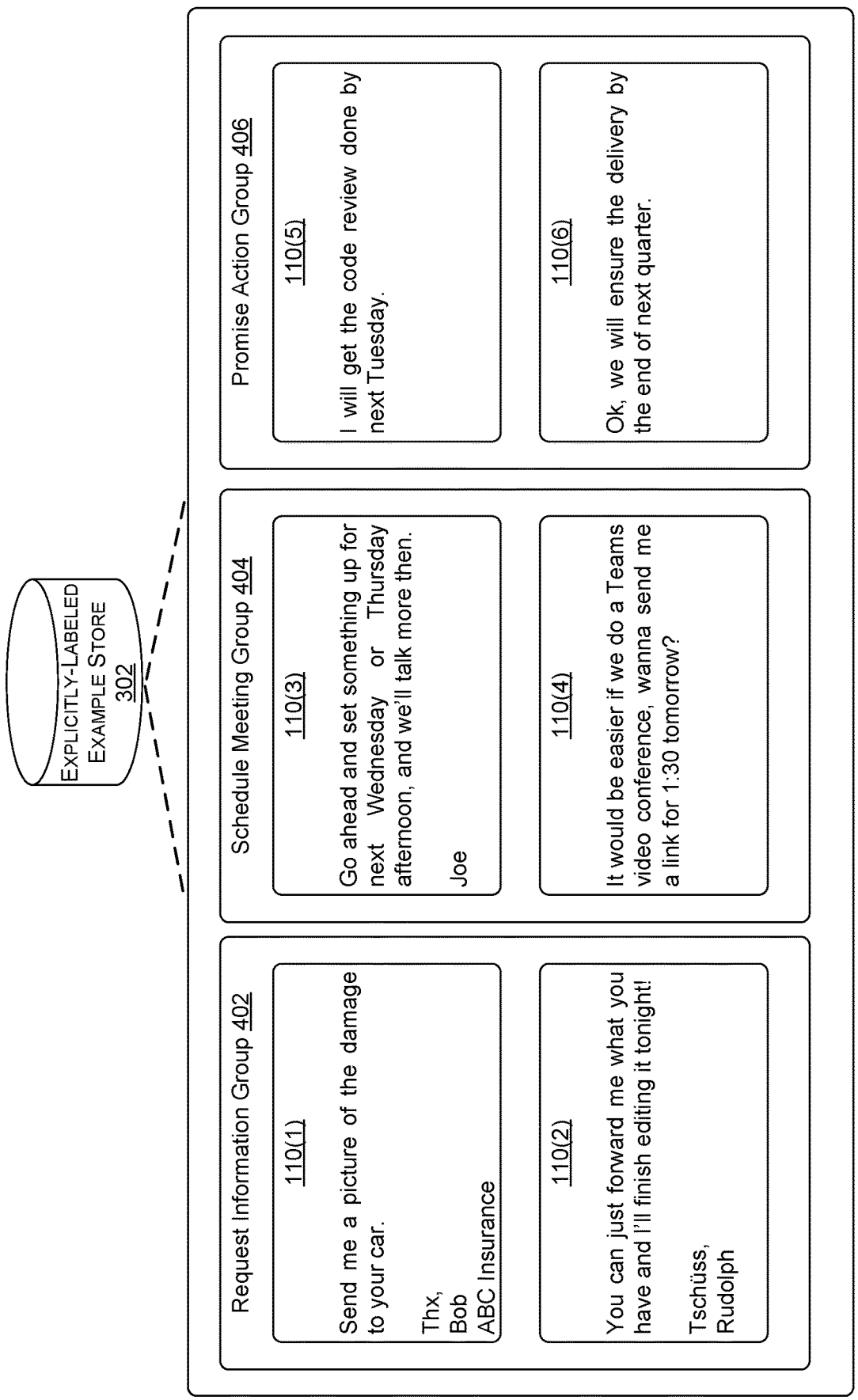
FIG. 4 illustrates examples of training examples with explicit labels, consistent with some implementations of the present concepts.

FIG. 4 illustrates examples of first training examples in the explicitly-labeled example store 302. FIG. 4 shows three exemplary groups of first training examples, a request_information group 402, a schedule meeting group 404, and a promise_action group 406. The request_information label is associated with explicitly-labeled first training examples 110(1) and 110(2) in the request_information group, the schedule_meeting label is associated with explicitly-labeled first training examples 110(3) and 110(4) in the schedule_meeting group 404, and the promise_action label is associated with explicitly-labeled first training examples 110(5) and 110(6) in the promise_action group 406. In this case, assume a human user or automated agent has evaluated each of first training examples 110(1) through 110(6) and assigned a corresponding explicit label thereto.

Figure 5:
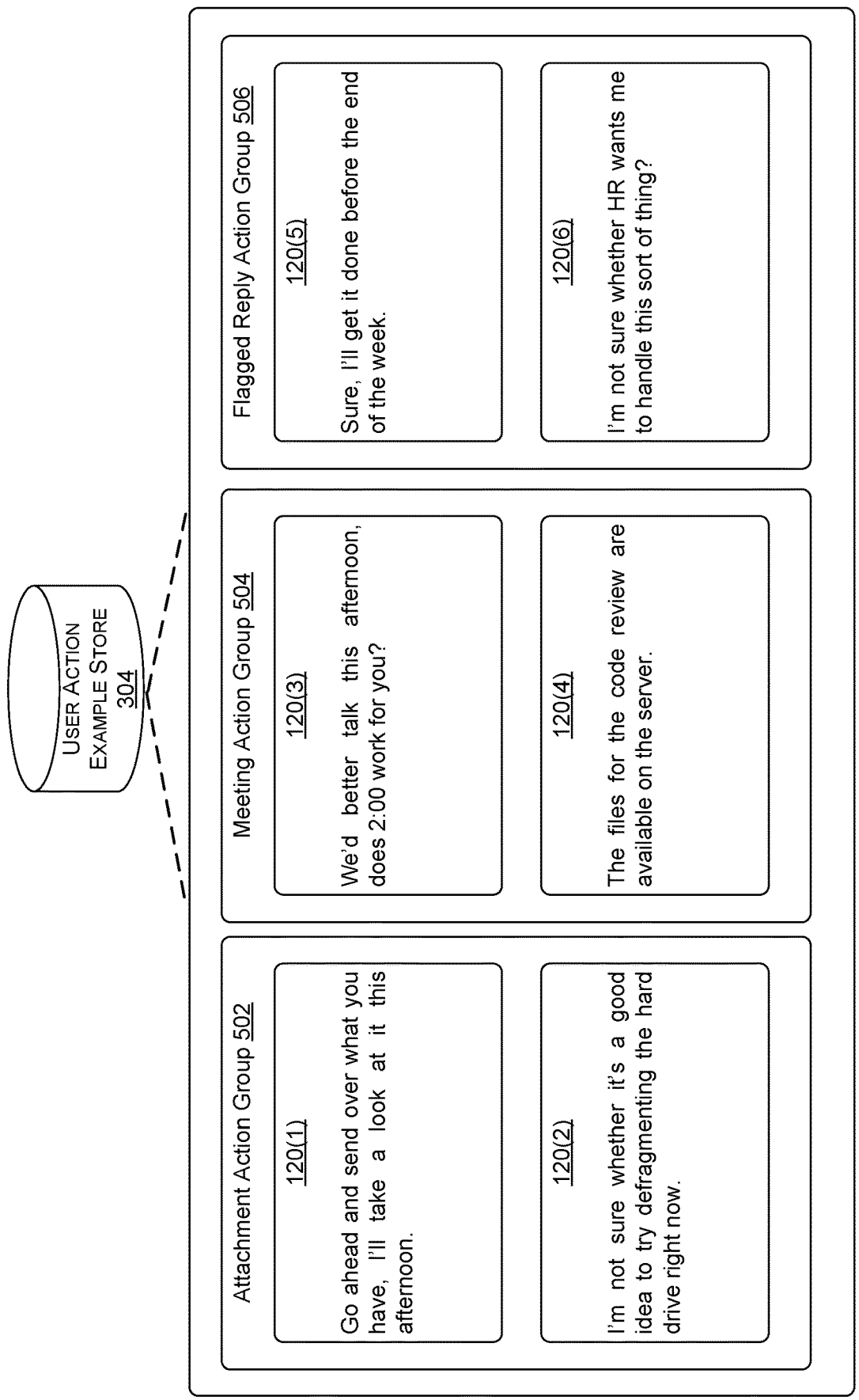
FIG. 5 illustrates examples of training examples with associated user actions, consistent with some implementations of the present concepts.

FIG. 5 illustrates examples of second training examples in the user action example store 304. FIG. 5 shows three user action groups and associated second training examples. Attachment action group 502 includes second training examples 120(1) and 120(2), meeting action group 504 includes second training examples 120(3) and 120(4), and flagged reply action group 506 is associated with second training examples 120(5) and 120(6). As previously noted, some implementations can map each type of action to a corresponding inferred label.

For instance, the attachment action group 502 can include any email that receives a subsequent reply with an attachment. For instance, second training examples 120(1) and 120(2) may both have received responses with an attachment. Thus, both of these training examples can have corresponding inferred labels of request_information. However, note that second training example 120(2) does not request_information from the recipient. This is an example of a noisy training example, e.g., the recipient happened to reply with an attachment, but not as a consequence of any request by the sender of second training example 120(2). Thus, in this case, the request_information inferred label for second training example 120(2) introduces noise into the training process.

As another example, the meeting action group 504 can include any email that has a subject that matches a corresponding meeting on a user's calendar. For instance, second training examples 120(3) and 120(4) may both have subject lines that happen to match scheduled meetings for a user. Thus, both of these second training examples can have corresponding inferred labels of schedule_meeting. However, note that second training example 120(4) does not request to schedule a meeting with the recipient. This is another instance of a noisy training example.

As a third example, the flagged reply action group 506 can include any email that replies to an email that is flagged. For instance, second training examples 120(5) and 120(6) may both be responses to flagged emails. Thus, both of these training examples can have corresponding inferred labels of promise_action. However, note that second training example 120(6) does not promise that the recipient will perform any action. This is yet another example of a noisy training example.

In practice, there may be many training examples associated with each user action and each corresponding inferred label. While the inferred labels may not be true for every example associated with a given action, the inferred labels can nevertheless provide a useful, albeit noisy, training signal that can be used for training a machine learning model, as discussed more below.

Algorithmic Details of Parameter Adjustment

The following discussion provides algorithmic details on how parameter adjustment process 306 can be employed in an email context, using training examples such as those discussed above with respect to FIGS. 4 and 5. In addition, the following section reports some experimental results for experiments conducted by training a machine learning model using the disclosed techniques.

Problem Statement

Let $\mathcal{D}=\{x_i, y_i\}_{i=1}^n$ denote a set of n natural language messages (e.g., email messages) with manually annotated or "clean" labels, e.g., from explicitly-labeled example store 302. Further, let $\chi=\{x_i\}_{i=1}^n$ denote the messages and $\mathcal{Y}=\{y_i\}_{i=1}^n$ the corresponding clean labels. Each message $x_i=\{w_1^i, \ldots, w_{m_i}^i\}$ contains a sequence of $m_i$ words. In addition to the small set of labeled examples, there can be a large set of unlabeled examples, such as user action example store 304. The size of the clean labeled set n can be much smaller than the unlabeled set due to labeling costs or privacy concerns for email data. For the widely available unlabeled samples, inferred or "weak" labels can be obtained based on user actions associated with these emails. Denote the "weakly" labeled set of training examples in the user action example store by $\tilde{\mathcal{D}}=\{\tilde{x}_j, \tilde{y}_j\}_{j=1}^N$ where $\tilde{\chi}=\{\tilde{x}_j\}_{j=1}^N$ denotes the set of N unlabeled messages and $\tilde{\mathcal{Y}}=\{\tilde{y}_j\}_{j=1}^N$ denotes the set of weak labels inferred from user interactions. Given $\mathcal{D}$ and $\tilde{\mathcal{D}}$, the disclosed implementations can learn a machine learning model, such as an intent classifier $f:\chi \to \mathcal{Y}$, which generalizes well onto unseen samples.

Dataset

One real-world enterprise email dataset that can be employed is referred to herein as Avocado. Douglas Oard, William Webber, David Kirsch, and Sergey Golitsynskiy, Avocado Research Email Collection, Philadelphia: Linguistic Data Consortium, 2015. Avocado contains an anonymized version of Outlook® mailboxes for 279 employees with various meta information. The full Avocado corpus contains 938,035 emails, 26,980 meeting schedules, and 325,506 attachments. The disclosed implementations can be utilized to perform multiple intent detection tasks on this data and accordingly devise weak labeling functions from user interactions.

Email intents can be broadly categorized into four major categories that characterize the intent of a given email message: information exchange, task management, scheduling and planning, and social communications. Each category can have multiple fine-grained intents. For instance, in the case of information exchange, request_information is an intent that indicates the sender is requesting information that can be potentially responded to by sharing a document. Schedule_meeting refers to the sender's intention to organize an event such as a physical meeting or a phone call, which belongs to the broader intent of scheduling and planning. In the case of task management intent, promise_action is an intent that indicates the sender is committing to complete a future action. As noted previously, the disclosed implementations provide examples using three intents—request_information, schedule_meeting, and promise_action (denoted below by RI, SM, and PA, respectively). For instance, predicting that a received email has the RI intent allows an intelligent assistant system to automatically suggest files to share with the requester. This can result in improving the overall user experience and also user productivity.

Deriving Weak or Inferred Labels from User Interactions

With human annotations being difficult to obtain on a large scale, it may be cheaper and more beneficial to leverage weak supervision to build supervised models, such as those based on deep neural networks. For email data, such weak supervision can be derived from user actions associated with individual emails. The following provides several examples of how to automatically obtain such weak or inferred labels from user interactions by using labeling functions.

For each of the aforementioned intent types, weak labeling functions can be defined as follows:

Request_Information (RI): The action of replying to an email with an attachment may potentially indicate the email it replies to has the intent of RI. For example, the email "Please forward me the final version for the slides" is asking the recipient(s) to send a file back to the sender. Now, if a user replies with an email "Please find the paper draft as attached" along with an attachment, then the replied-to email is likely to contain the RI intent. However, this rule will have false positives since a user may reply with attachments even without being asked. Additionally, messages with an RI intent may not receive a reply with an attachment or even any reply. Formally, one example weak or inferred labeling function is:

reply_with_attachment: If an email a is replying to another email b with an attachment, then email b is weakly-labeled with the RI intent.

In some implementations, trivial attachments that are not likely to contain information related to RI intent (e.g. contact information, signatures, images, etc.) can be ignored.

Schedule_Meeting (SM): Given access to not only user emails but also their calendars, the temporal footprints of the scheduled meetings can be explored, by considering the subject line of the meeting, time, location, and attendees. However, emails that propose meeting requests may not be directly associated with the schedule information. Some implementations may use one or more words from the subject lines of the schedules as a query and search the emails that contain similar subject lines. This reveals the confirmation emails sent after someone accepted the meeting request. The emails can be temporally ordered to identify the sent email together with the confirmation, and the earlier email can be characterized as having the SM intent. One corresponding weak or inferred labeling function can be defined as:

confirmed_schedule: If an email a has the same subject line with another email b confirming the schedule where a precedes b in the timeline, then a is weakly-labeled with the SM intent.

Promise_Action (PA): Some email applications, such as Outlook, allow users to maintain a task list of items they need to do later. Tasks can be added to the task list by either directly creating them or by flagging emails that may contain future action items. The flags could be added by either the sender or the recipient of an email. The disclosed implementations can employ flagging behavior as a proxy label for future actions intent. For example, given an email from the sender as "Would you be able to present your work in the meeting next week?" with the urgency flag set and a response email as "I can do this next week"—the disclosed implementations can consider the latter email to have the PA intent. One corresponding weak or inferred labeling function can be defined as:

urgency_reply: If an email a has replied to an email b which had a flag set, then a is weakly-labeled with the PA intent.

Note that it is possible to devise other rules for different intents and domains.

As discussed, weak or inferred labeling functions tend to produce noisy labels, e.g., with relatively low accuracy compared to manual or explicit labelling. For instance, the aforementioned labeling functions were applied to the Avocado corpus, and the following weakly-labeled positive instances were obtained: 8,100 emails for RI, 4,088 emails for SM, and 2,135 emails for PA. Emails discarded by the weak labeling functions can be treated as negative instances. For each intent, the same amount of negative instances as the positive ones were sampled to construct a balanced dataset. Note that the total amount of weak labeled data depends on the overall size of the email collection, how prevalent an intent is, and the trigger rate of the labeling functions. In practice, developers may have access to a much larger pool of unannotated emails compared to the Avocado dataset containing mailboxes for only 279 users. This may enable generating even larger weakly-labeled instances and potentially further improving the overall performance of a trained model.

To assess the quality of these weakly-labeled instances, 100 emails were randomly from each of the positive and negative weakly-labeled sets and were given manual annotations. The accuracy of the weak labeling functions for the three intents RI, SM, and PA were 0.675, 0.71, 0.63, respectively. Note that the accuracy of the weak labeling functions, while not perfect, is also significantly better than random (0.5) for binary classification. This indicates that the weak labeling functions carry a useful, albeit noisy, signal that can be used as a training signal as discussed herein.

Incorporating Training Examples with Clean or Explicit Labels

Training neural networks or other machine learning models with only weakly supervised noisy labels is challenging since they have high capacity to fit and memorize the noise. The disclosed implementations can mitigate this issue by incorporating clean labeled data in the training process. However, as discussed earlier, it is hard to collect explicitly-annotated data at scale for certain tasks. For instance, consider a model that is intended to support many intents across thousands of domains/organizations due to resource and privacy constraints. Thus, some implementations limit the number of explicitly-labeled examples, e.g., to 10% of the total samples used for training. In some implementations, the training examples in each set do not overlap.

To obtain results reported below, 10,000 Avocado email threads were selected randomly and excluded from the weak supervision data collection. Manual annotations were obtained for these email threads such that the annotated or explicitly-labeled set constitutes at most 10% of all the labeled samples (weakly as well as manually labeled). To this end, three annotators examined all the messages in each thread and annotated the first message with one or more of the intents as described above with majority votes deciding the final label. The Cohen's kappa coefficient for inter-annotator agreement for each task was greater than or equal to 0.61 indicating a substantial agreement among the annotators.

For each intent, more negative samples were available than positive ones. The negative class can be down-sampled to make the classes balanced for each task. Although the entire Avocado email collection is large, a model was trained using relatively few manually annotated clean samples for each intent. This also motivates the idea of incorporating user interactions as weak supervision to build better predictive models than using the clean samples alone.

Joint Learning

Having defined the problem setting for intent detection with weakly supervised learning in the presence of a small set of cleanly-labeled examples and a large set of weakly-labeled examples, the following discusses one specific approach to leverage these two sources of supervision jointly to learn an end-to-end model.

As noted previously, in the email intent detection scenario discussed herein, there are two distinct sources (dual-source) of supervision: clean labels coming from manual annotation and weak labels coming from heuristic labeling functions based on user interaction signals. The disclosed implementations can be employed to build a framework that leverages signals coming from both sources of supervision and learn an underlying common representation from the context. As noted above with respect to FIG. 1, a deep neural network is provided where the lower layers of the network (such as encoder 130) learn common feature representations of the input space (e.g., text of messages), and the upper layers of the network (such as classification layers 140 and 150) separately model the mappings to each of the different sources of supervision. This model structure allows training to jointly leverage both the correlation and distinction between the clean and weak labels. Since the weak labels are obtained from labeling functions defined over user interactions, they contain complementary information to the clean labels annotated from message contents.

Recall $\mathcal{D} = \{x_i, y_i\}_{i=1}^n$ and $\tilde{\mathcal{D}} = \{\tilde{x}_j, \tilde{y}_j\}_{j=1}^N$ to be the clean labeled data (based on manual annotation) and the weak labeled data (based on user actions) respectively. Let enc(x; θ) to be an encoder that produces the content representation of an instance x with parameters θ. Note that this encoder is shared between instances from both the clean and the weak set. Let $f_c(enc(x); \gamma_c)$ and $f_w(enc(\tilde{x}); \gamma_w)$ be the functions that map the content representation of the instances to their labels on the clean and weakly supervised data, respectively. While the encoder has shared parameters θ, the parameters $\gamma_c$ and $\gamma_w$ are different for the clean and weak sources respectively to capture their individual characteristics. The final objective for jointly optimizing the predictions from dual sources of supervision can be given by:

$$\min_{\theta, \gamma_c, \gamma_w} \mathbb{E}_{(x,y) \in \mathcal{D}} \mathcal{L}(y, f_c(enc(x))) + \alpha \mathbb{E}_{(\tilde{x}, \tilde{y}) \in \tilde{\mathcal{D}}} \mathcal{L}(\tilde{y}, f_w(enc(\tilde{x}))) \quad (1)$$

where $\mathcal{L}$ denotes the loss function to minimize the prediction error of the model, and a is a hyperparameter that controls the relative importance of the loss functions computed over the data from clean and weak sources.

Weak Label Correction

As noted, inferred labeling functions can be heuristic and can generate false labels. Some implementations can utilize inferred labels directly for training, whereas other implementations can perform correction of these noisy labels before feeding them into second classification layer 150, e.g., using rectifier 160. For instance, the disclosed implementations can learn a label corruption matrix to estimate clean labels from the weak labels with the Gold Loss Correction approach. Dan Hendrycks, Mantas Mazeika, Duncan Wilson, and Kevin Gimpel, "*Using Trusted Data to Train Deep Networks on Labels Corrupted by Severe Noise,*" In NeurIPS, 2018.

Given a set of instances $\mathcal{D} = \{x_i, y_i\}_{i=1}^n$ with manually annotated labels y for L categories, and a weak labeled set $\tilde{\mathcal{D}} = \{\tilde{x}_j, \tilde{y}_j\}_{j=1}^N$, GLC aims to estimate a matrix $\mathbf{C} \in \mathcal{R}^{L \times L}$ to model the label corruption process. A classifier $f$ can be trained on the weakly-labeled data $\tilde{\mathcal{D}} = \{\tilde{x}_j, \tilde{y}_j\}_{j=1}^N$ as:

$$f(\tilde{x}) = \hat{p}(\tilde{y}|\tilde{x}, \theta)$$

Let $\chi_l$ be the subset of x with label y=l. Assuming the conditional independence of $\tilde{y}$ and y given x, i.e., $p(\tilde{y}|y, x) = p(\tilde{y}|x)$, the corruption matrix $\tilde{C}$ can be estimated as follows, $$C_{lr} = \frac{1}{|\mathcal{X}_l|} \sum_{x \in \mathcal{X}_l} \hat{p}(\tilde{y} = r|x) = \frac{1}{|\mathcal{X}_l|} \sum_{x \in \mathcal{X}_l} \hat{p}(\tilde{y} = r|y = l, x) \approx p(\tilde{y} = r|y = l) \quad (2)$$

With the new estimated $\mathbf{C}$, a new classification model $f'(x) = \hat{p}(y|x, \theta)$ can be trained by solving the following optimization problem:

$$\min_\theta \mathbb{E}_{(x,y) \in \mathcal{D}} \mathcal{L}(y, f'(x)) + \mathbb{E}_{(\tilde{x}, \tilde{y}) \in \tilde{\mathcal{D}}} \mathcal{L}(\tilde{y}, C \square Tf'(\tilde{x})) \quad (3)$$

where $\mathcal{L}$ is a differentiable loss function to measure the prediction error, such as the cross-entropy loss.

The GLC correction approach described above can be employed to correct the weak labels for instances in $\tilde{\mathcal{D}}$. Using Equation 3, a label correction function $f'(\tilde{x})$ can be learned that rectifies the weak labels coming from the labeling functions for each instance $\tilde{x} \in \tilde{\mathcal{D}}$. Next, obtain a label corrected weak supervision set $\mathcal{D}' = \{\tilde{x}_j, f'(\tilde{x}_j)\}_{j=1}^N$. Note that the label correction network reduces noise but the rectified labels could still be erroneous, and therefore considered as another source of weak supervision. In the new setting, the weakly-labeled instances $\tilde{\mathcal{D}}$ from the labeling function can be fed into the label correction network to obtain the rectified instances $\mathcal{D}'$. These can used as an input to the neural network. Formally, the overall objective function of the final model can be given by:

$$\min_{\theta, \gamma_c, \gamma_w} \mathbb{E}_{(x,y) \in \mathcal{D}} \mathcal{L}(y, f_c(enc(x))) +$$

$$\alpha \mathbb{E}_{(\tilde{x}, f'(\tilde{x})) \in \mathcal{D}'} \mathcal{L}(f'(\tilde{x}), f_w(enc(\tilde{x}))) \quad (4)$$

Note also that the term "inferred label" can encompass labels derived from heuristic functions or rules applied to actions taken by a human or machine, whether or not the inferred labels are subjected to rectification processing as described above.

Training Schedule

One approach to training a model is to consider all the weakly-labeled samples jointly for learning. However, not all training samples are necessarily created equal. Some of the weak instances may be noisier than others, whereas some are quite different in nature than the clean samples and therefore more difficult to learn from. The following describes processing that can be performed by batch selector 308 to determine the order in which training examples in the user action example store 304 are prioritized for batch training.

The disclosed implementations can employ a training schedule that first learns from batches of easy samples followed by batches of more difficult examples. To distinguish easy from difficult examples, the learned model can be used to identify an easy set of examples given by a good fit in the model space. Consider $v(\tilde{x}) \in \{0,1\}$ to be a latent variable for each weak instance $\tilde{x}$ that dictates whether to consider it for training. Correspondingly, the objective function can be modified as follows.

$$\min_{\theta, \gamma_c, \gamma_w, v \in \{0,1\}^N} \mathbb{E}_{(x,y) \in \mathcal{D}} \mathcal{L}(y, f_c(enc(x))) + \quad (5)$$

$$\alpha \mathbb{E}_{(\tilde{x}, f'(\tilde{x})) \in \mathcal{D}'} [v(\tilde{x}) \cdot \mathcal{L}(f'(\tilde{x}), f_w(enc(\tilde{x})))] - \lambda \|v\|_1$$

There are two distinct sets of parameters to learn corresponding to $w = \{\theta, \gamma_c, \gamma_w\}$ for the neural network parameters and latent variables v for the training sample selection. To optimize the above equation, alternate minimization can be employed. First, fix v and estimate the model parameters w using gradient descent.

Next, fix w and estimate $v(\tilde{x})$ for all $\tilde{x} \in \tilde{\mathcal{D}}$. The partial derivative of Equation 5 with respect to $v(\tilde{x})$ is given by $\alpha \mathcal{L}(f'(\tilde{x}), f_w(enc(\tilde{x})) - \lambda$. An optimal solution for the equation is given by:

$$v(\tilde{x}) = \begin{cases} 1, & \text{if } \mathcal{L}(f'(\tilde{x}), f_w(enc(\tilde{x}))) < \frac{\lambda}{\alpha} \\ 0, & \text{otherwise} \end{cases}$$

Here $$\frac{\lambda}{\alpha}$$

indicates whether an instance is easy to learn given by a small value of the corresponding loss function $\mathcal{L}(\cdot)$. A high loss indicates a poor fit of the sample in the model space and therefore ignored during training. $\lambda$ as a hyperparameter allows control of the injection of weak samples in the current training set: a very low value admits few whereas a very high value admits all samples.

Some implementations may initially train on only the clean data for a few epochs to trace the corresponding model space. Thereafter, the weakly-labeled samples can be gradually incorporated by increasing $\lambda \in \{0.1, 0.2, \ldots\}$ till all samples are included in the training set.

Training Process

Some implementations employ mini-batch gradient descent with the Adadelta optimizer to learn the parameters. Matthew D Zeiler. "*Adadelta: An Adaptive Learning Rate Method*," arXiv preprint arXiv:1212.5701, 2012. Adadelta is an adaptive learning rate method which divides the learning rate by an exponentially decaying average, and is less sensitive to the initial learning rate.

First, train a GLC model to obtain the label corrected weak supervision set $\mathcal{D}'$. To this end, a classifier $f$ can be trained on weak supervision data $\tilde{\mathcal{D}}$ and used to estimate the label corruption matrix $\mathbf{C}$. Thereafter, train a new classifier $f'$ with the corruption matrix on the weakly supervised data, and obtain the data with corrected weak labels $\mathcal{D}'$.

Next, train for a few epochs on the clean data to have an initial estimate of w. Given w and an initial value of $\lambda$, compute loss for all the weak instances and include those with loss less than $$\frac{\lambda}{\alpha}$$

in the training set. This is followed by re-estimating w. Iterate over these steps and gradually increase $\lambda$ until all the samples are accounted for or the model stops improving. For inference at runtime using machine learning model structure 200, the label of an instance x is predicted by $y = f_c(enc(x))$.

Experimental Results

The disclosed implementations were used to train and test several machine learning models, using binary intent classification as an evaluation metric. A dataset with 10% manually-provided explicit labels and 90% inferred labels from user actions was evaluated, e.g., for a "clean" training data ratio of 10%. Experiments were also conducted by down-sampling the clean data to 1% of total training data. Models trained using the disclosed model structure and techniques are referred to below as "Hydra."

The following experiments were conducted using AvgEmb and BiLSTM for the encoder. AvgEmb learns the representation with the average word embedding of all the words in the message text. Cer, Daniel, et al. "Universal sentence encoder," arXiv preprint arXiv:1803.11175, 2018. BiLSTM is a bi-directional recurrent neural network that learns the long-term dependencies in the text comprising of a sequence of tokens. Alex Graves and Jürgen Schmidhuber, "Framewise Phoneme Classification With Bidirectional LSTM and Other Neural Network Architectures," Neural Networks, 18(5-6):602-610, 2005. During encoding, the input to the BiLSTM are the word embedding vectors of the input text.

For both AvgEmb and BiSLTM, pre-trained 300-dimensional GloVe embeddings were to initialize the embedding matrix. Jeffrey Pennington, Richard Socher, and Christopher Manning, "Glove: Global Vectors for Word Representation," in EMNLP, 2014. The embedding matrix was then fine-tuned during training. When using BiLSTM as the encoder, one hidden layer was used and the number of hidden states was set to 300, with the last hidden state as the final feature representation. A fully connected layer was employed with 300 hidden states after the BiLSTM network to capture the interaction across feature dimensions, using cross-entropy loss as L. For self-paced learning, the number of epochs was set to 10 for each run with a specific $\lambda$ varying from $[0.1, 0.2, \ldots]$, varying the hyperparameter $\alpha \in \{0.1, 1, 10\}$ and selecting the value of a that achieves the best performance on the validation set.

Models trained using the disclosed implementations were compared to baselines as follows. The first set of baselines uses the same base model as described above, a three-layer neural network with word embeddings, an encoder (AvgEmb or BiLSTM) and a softmax layer for classification layers. This model structure was trained using the following approaches:

Clean: Model trained on only the clean instances.

Weak: Model trained on only the weak labels derived from user actions. Weak labels are treated as if they are regular clean labels.

Clean+Weak: In this setting, merge both the sets (essentially treating the weak labels to be as reliable as the clean ones) and use them together for training.

Pre-Weak: Pre-train the model on the weakly-labeled instances. Then take the trained model and fine-tune all the parameters in all the layers end-to-end on the clean instances.

IWT: In Instance-Weighted Training (IWT), assign sample weights to each of the instances during learning. For this, modify Equation 1 as follows:

$$\min_{\theta, \gamma_c, \gamma_w} \mathbb{E}_{(x,y) \in \mathcal{D}} [u(x) \cdot \mathcal{L}(y, f_c(enc(x)))] + \alpha \mathbb{E}_{(\tilde{x}, \tilde{y}) \in \tilde{\mathcal{D}}} [v(\tilde{x}) \cdot \mathcal{L}(\tilde{y}, f_w(enc(\tilde{x})))]$$

with u>v forcing the model to focus more on the clean instances during learning. Note that the Clean+Weak baseline is a special case with $u(x) = 1 \forall x$.

Another baseline is the Gold Loss Correction (GLC) that estimates a label corruption matrix to model the correlation between weak and clean labels, which can be used to predict the unseen true labels.

TABLE 1

| Clean Ratio (Setting) | Intent | Encoder | Clean | Weak | Clean + Weak | Pre-Weak | IWT | GLC | Hydra |
|---|---|---|---|---|---|---|---|---|---|
| 10% (All) | RI | AvgEmb | 0.649 | 0.523 | 0.616 | 0.613 | 0.661 | 0.693 | 0.726 |
|  |  | BiLSTM | 0.688 | 0.524 | 0.684 | 0.717 | 0.771 | 0.717 | 0.804 |
|  | SM | AvgEmb | 0.650 | 0.624 | 0.691 | 0.676 | 0.713 | 0.694 | 0.731 |
|  |  | BiLSTM | 0.655 | 0.605 | 0.693 | 0.702 | 0.705 | 0.697 | 0.714 |
|  | PA | AvgEmb | 0.641 | 0.628 | 0.633 | 0.637 | 0.625 | 0.647 | 0.664 |
|  |  | BiLSTM | 0.608 | 0.547 | 0.611 | 0.631 | 0.616 | 0.635 | 0.660 |
| 1% (Tiny) | RI | AvgEmb | 0.560 | 0.523 | 0.529 | 0.542 | 0.563 | 0.592 | 0.664 |
|  |  | BiLSTM | 0.539 | 0.524 | 0.560 | 0.581 | 0.565 | 0.572 | 0.622 |
|  | SM | AvgEmb | 0.565 | 0.624 | 0.618 | 0.633 | 0.628 | 0.620 | 0.666 |
|  |  | BiLSTM | 0.538 | 0.506 | 0.626 | 0.608 | 0.625 | 0.617 | 0.630 |
|  | PA | AvgEmb | 0.584 | 0.628 | 0.633 | 0.616 | 0.622 | 0.613 | 0.647 |
|  |  | BiLSTM | 0.569 | 0.547 | 0.571 | 0.573 | 0.577 | 0.587 | 0.626 |

As can be seen, Hydra outperforms all baselines in all settings. Furthermore, the following observations were noted:
  Training only on the clean samples (even though they are much smaller in size) achieves better performance than training only on the weakly-labeled ones on an aggregate across all the tasks and settings (demonstrated by Clean>Weak).
  Incorporating weakly-labeled data even by simple aggregation with clean data like (Clean+Weak), pre-training (Pre-Weak) and instance weighting (IWT) improves model performance on an aggregate over that of using only the clean or weak data.
  More sophisticated methods of integrating weakly-labeled data with clean data gradually improves model performance on an aggregate across all the tasks and settings (demonstrated by >GLC>IWT>Pre-Weak>Clean+Weak>Clean>Weak).
  Finally, irrespective of the clean ratio, Hydra achieves the best performance in all settings.
higher clean ratios generally lead to better performance Further experiments were conducted to evaluate the contribution of self-paced learning in the framework. Hydra was trained leveraging all the clean and weak labels jointly without any curriculum. At each epoch, batches were sampled with equal number of instances from clean and weakly-labeled data and trained end-to-end optimizing Equation 4. The results were as follows:

TABLE 2

| Clean Ratio (Setting) | Components | Accuracy |
|---|---|---|
| 10% (All) | Hydra | 0.716 |
|  | -self-paced learning | 0.690 |
|  | -GLC | 0.688 |
| 1% (Tiny) | Hydra | 0.643 |
|  | -self-paced learning | 0.631 |
|  | -GLC | 0.632 |

Note that self-paced learning performs much better at higher values of clean ratio that contributes a larger set of clean samples for training. This results from the training schedule where a few epochs of training are performed on the clean data to trace the initial model space. For a clean ratio of 10%, Hydra with both self-paced learning and GLC (e.g., rectification) achieved accuracy of 0.716 on the test set. Removing self-paced learning dropped the accuracy to 0.690, and removing GLC dropped the accuracy to 0.688. With a clean ratio of 1%, the values were 0.643 for Hydra with both self-paced learning and GLC, dropping to 0.631 when removing self-paced learning and to 0.632 when removing GLC.

Generally, the results reported above suggest that weak training signals, such as obtained from inferred labels, can improve classification accuracy for model training provided the weak labels are better than random guessing. Thus, for binary classification, accuracy of the weak training data should be >50%. More generally, the weak training data should have greater than (100/L) % accuracy for L-class classification. Clean label accuracy should generally be significantly better than weak label accuracy. The overall model performance improves with better-quality clean labels and large-scale weak labels.

Example System

Figure 6:
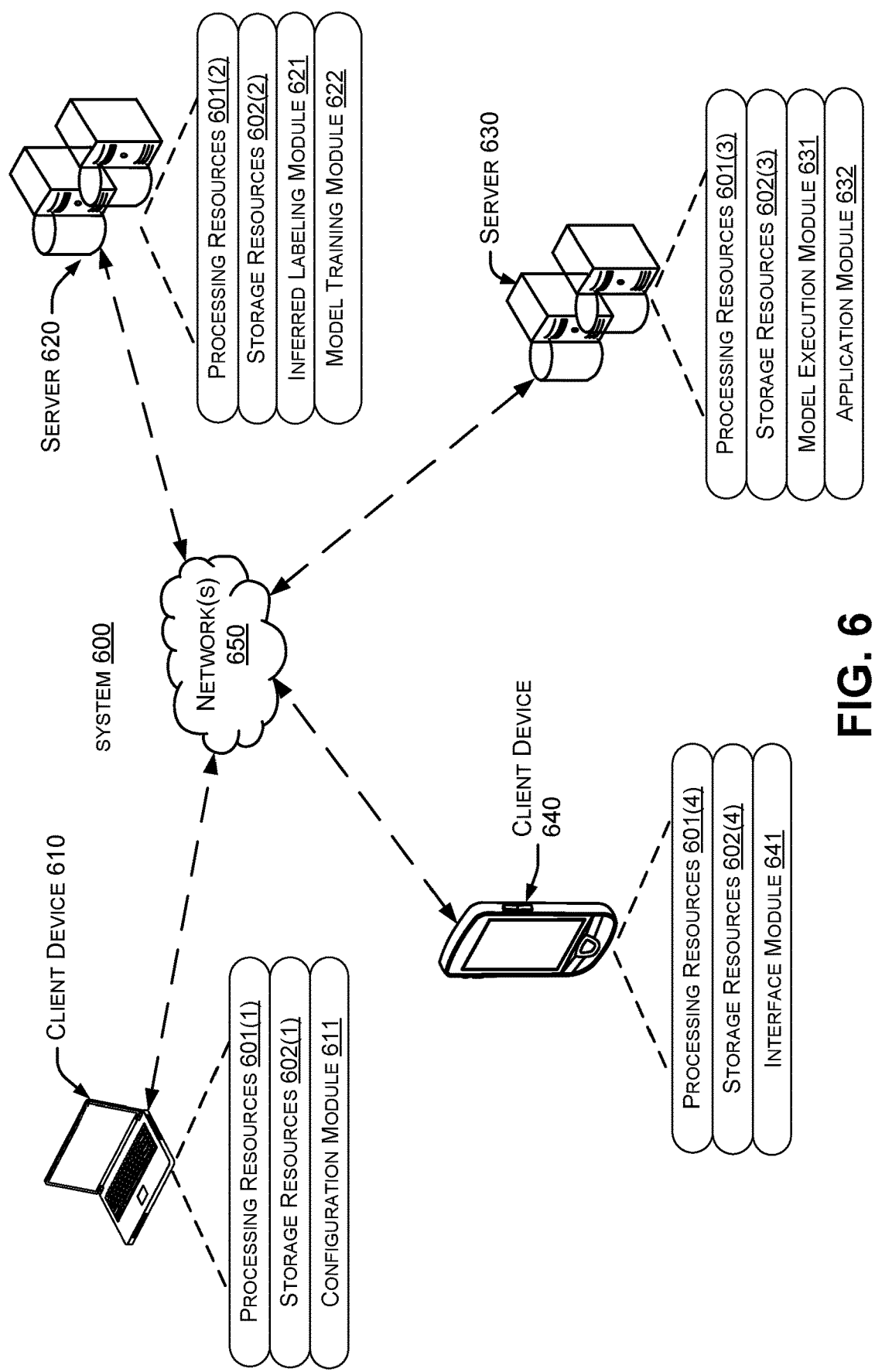
FIG. 6 illustrates an example system, consistent with some implementations of the present concepts.

The present implementations can be performed in various scenarios on various devices. FIG. 6 shows an example system 600 in which the present implementations can be employed, as discussed more below.

As shown in FIG. 6, system 600 includes a client device 610, a server 620, a server 630, and a client device 640, connected by one or more network(s) 650. Note that the client devices can be embodied both as mobile devices such as smart phones and/or tablets as well as stationary devices such as desktops, server devices, etc. Likewise, the servers can be implemented using various types of computing devices. In some cases, any of the devices shown in FIG. 6, but particularly the servers, can be implemented in data centers, server farms, etc.

Certain components of the devices shown in FIG. 6 may be referred to herein by parenthetical reference numbers. For the purposes of the following description, the parenthetical (1) indicates an occurrence of a given component on client device 610, (2) indicates an occurrence of a given component on server 620, (3) indicates an occurrence on server 630, and (4) indicates an occurrence on client device 640. Unless identifying a specific instance of a given component, this document will refer generally to the components without the parenthetical.

Generally, the devices 610, 620, 630, and/or 640 may have respective processing resources 601 and storage resources 602, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 610 can include a configuration module 611 that can interact with an inferred labeling module 621 and a model training module 622 on server 620. The model training module can train a model as discussed above, e.g., by implementing training workflow 300. Generally speaking, the configuration module can provide certain configuration parameters to the inferred labeling module and/or the model training module. For instance, the configuration module can provide one or more heuristic labeling functions that the inferred labeling module can apply to obtain inferred labels, as discussed elsewhere herein. The configuration parameters can also include training parameters that specify information such as learning rates, unsupervised learning parameters, data sources with explicit labels or associated user actions, supervised learning parameters, labeled data sources, etc.

The model training module 622 can output a trained, final model to server 630. Model execution module 631 can execute the final model in response to received inputs. For example, the interface module 641 on client device 640 can provide input data to the model execution module for evaluation by the model. The model execution module can process the uploaded input data using the final model and provide model outputs in response by sending the model outputs to the client device 640 over network(s) 650.

In some instances, the server 630 also includes an application module 632 that interacts with the model execution module 631. For instance, the application module can provide a search engine that uses the trained model to perform application functionality based on the model outputs. For email applications, the application functionality can include automating suggestions for attachments and/or automated meeting or task scheduling functionality. When the model is suitably trained for tasks related to other types of applications, the application module can perform other types of associated automated actions, as discussed more below.

First Example Method

Figure 7:
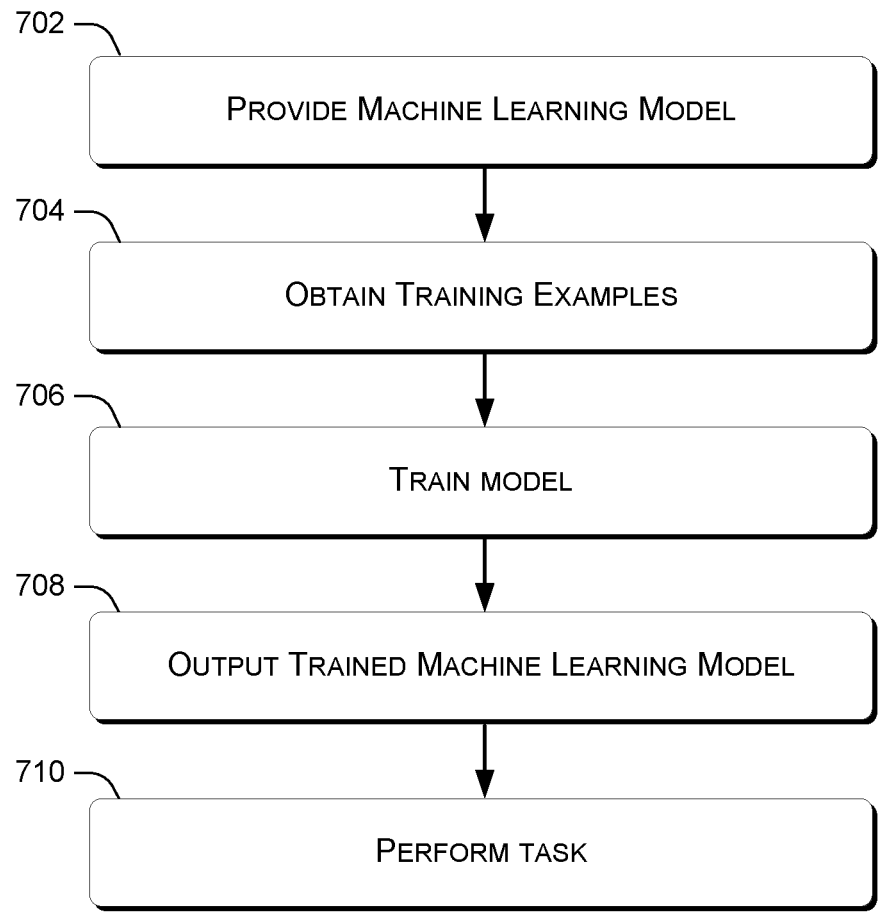
FIG. 7 illustrates an example method or technique for training and utilizing a machine learning model, consistent with some implementations of the present concepts.

FIG. 7 illustrates an example method 700, consistent with the present concepts. As discussed in more detail below, method 700 can be implemented on many different types of devices, e.g., by one or more cloud servers, by a client device such as a laptop, tablet, or smartphone, or by combinations of one or more servers, client devices, etc. For instance, method 700 can be performed by model training module 622.

Method 700 begins at block 702, where a machine learning model is provided. For example, the machine learning model can have a neural network structure such as machine learning model structure 100, discussed above with respect to FIG. 1. The machine learning model structure can have a first classification layer, a second classification layer, and an encoder that feeds into the first classification layer and the second classification layer.

Method 700 continues at block 704, where training examples are obtained. As discussed, the sources of training data can include first training examples with explicit labels and second training examples with associated actions and/or inferred labels. In some implementations, block 704 can include associating one or more inferred labels with each of the second training examples.

Method 700 continues at block 706, where the model is trained using the first and second training examples. The model can be trained using a training objective that considers first training loss of the first classification layer for the explicit labels and second training loss of the second classification layer for the inferred labels. In some cases, the inferred labels are rectified prior to determining the second training loss. In further cases, the second training examples are selected iteratively, using a self-paced learning approach.

Method 700 continues at block 708, where a trained machine learning model is output. The trained machine learning model can have at least the encoder and the first classification layer, as discussed above with respect to FIG. 2.

Method 700 continues at block 710, where a particular task is performed using the trained machine learning model, as also discussed elsewhere herein.

Second Example Method

Figure 8:
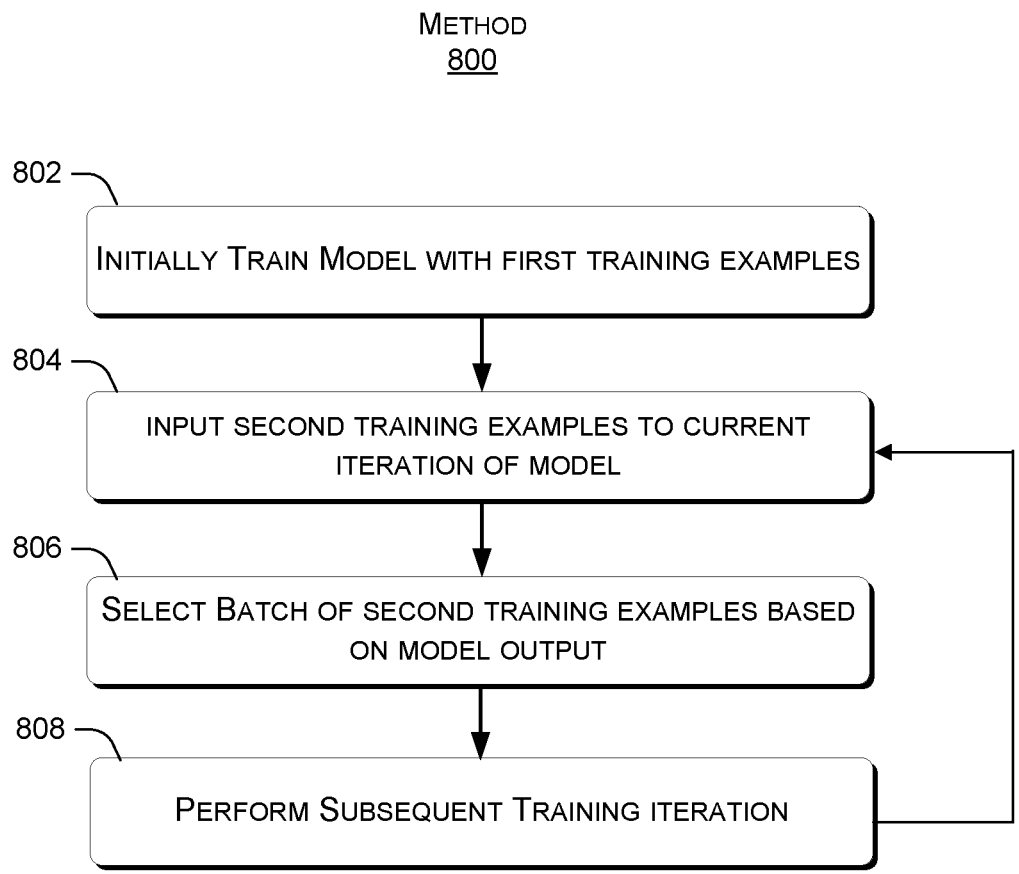
FIG. 8 illustrates an example method or technique for self-paced learning of a machine learning model, consistent with some implementations of the present concepts.

FIG. 8 illustrates an example method 800, consistent with the present concepts. As discussed in more detail below, method 800 can be implemented on many different types of devices, e.g., by one or more cloud servers, by a client device such as a laptop, tablet, or smartphone, or by combinations of one or more servers, client devices, etc. Generally speaking, method 800 may be employed for self-paced learning by a machine learning model (e.g., in block 706 of method 700).

Method 800 begins at block 802, training an initial iteration of a machine learning model using explicit labels of the first training examples. In some cases, multiple initial iterations are performed, e.g., until the explicitly-labeled training examples are exhausted.

Method 800 continues at blocks 804, 806, and 808, which can iteratively train subsequent iterations of the machine learning model as follows.

Block 804 can include inputting instances of second training examples into a current iteration of the machine learning model. The current iteration of the model can produce output, e.g., a distribution of confidence values for each intent.

Block 806 can include selecting a batch of the second training examples for a subsequent training iteration based at least on output of the current iteration. For instance, the batch can include those second training examples having the highest confidence values for each intent, and can exclude other second training examples for which the current iteration of the model has relatively lower confidence.

Block 808 can include performing the subsequent iteration of the machine learning model using inferred labels associated with the selected batch of the second training examples.

In some cases, method 800 is performed iteratively, e.g., blocks 804, 806, and 808 can be performed multiple times (e.g., over different batches of training data) until a stopping condition is reached, at which point a final, trained model can be output. As also noted, prioritization of high-confidence explicitly-labeled examples can also be performed in a manner similar to that described above for inferred labels in block 806.

Example User Experiences

The following describes several user experiences that can be provided using a machine learning model that is trained using the disclosed implementations.

Figure 9:
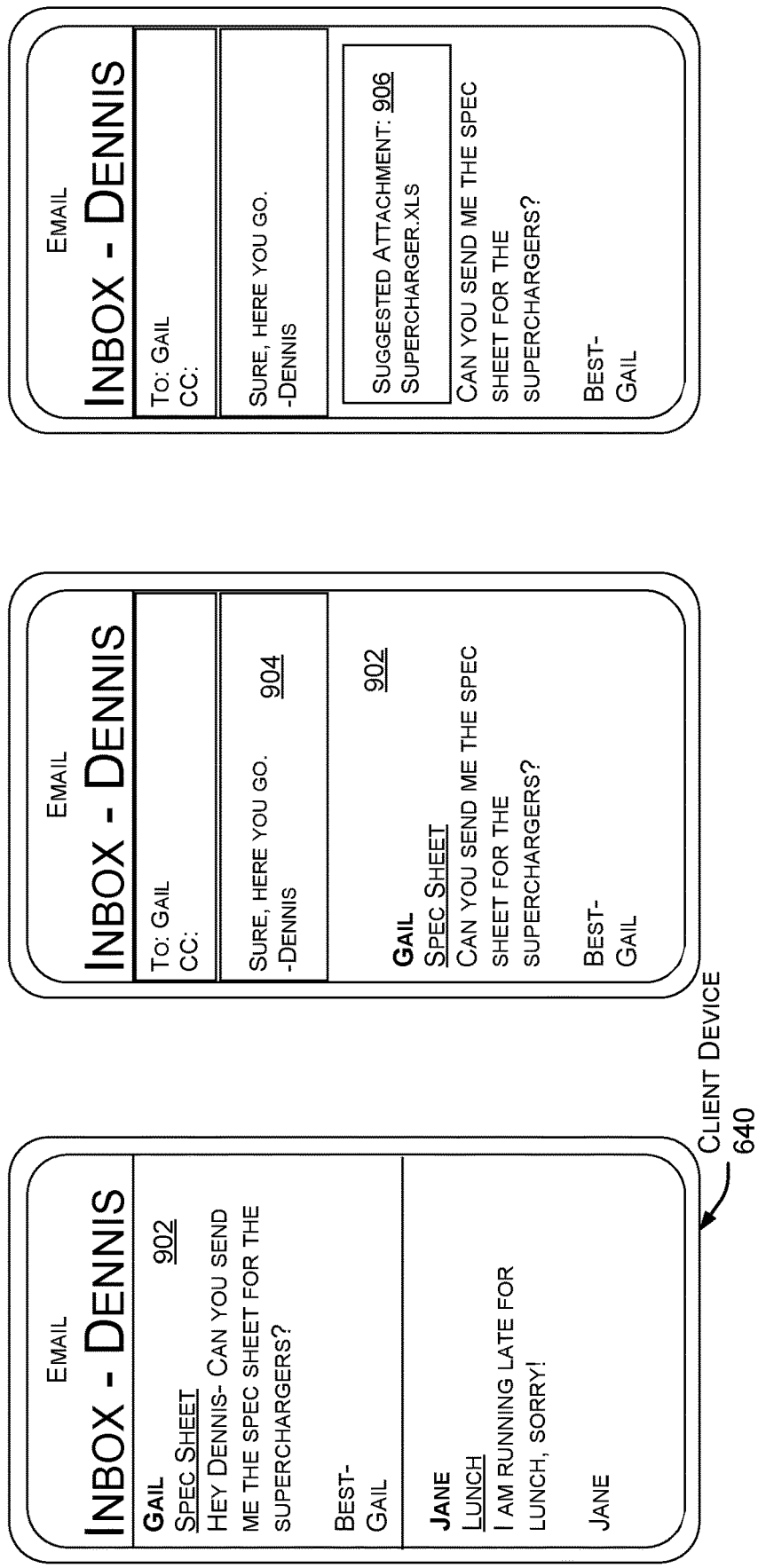

FIG. 9 illustrates an example scenario 900 where a user named Dennis interacts with client device 640. As noted above, the client device can have an interface module 641, which can be a local application that can interact with a corresponding application module 632 on server 630. The server application module can execute a machine learning model to provide certain automated actions, as discussed further below.

FIG. 9 shows an example scenario 900. Scenario 900 starts at Instance 1, where a user named Dennis receives an email 902 from a user named Gail. Dennis begins drafting a response email 904 to Gail as shown in Instance 2, and the application module 632 inputs Gail's email 902 to the model execution module 631. The model execution module can input the text of her email to a model that has been trained as disclosed herein, which can output a predicted classification for the intent of Gail's email, e.g., request_information. Based on the predicted intent, the application module can trigger an automated action that facilitates providing the requested information in response to the request, such as suggesting an attachment that is responsive to Gail's email. Client device 640 can display a suggested attachment user interface element 906 as shown in Instance 3, which identifies a suggested attachment to satisfy the predicted intent of Gail's email.

FIG. 10 illustrates an example scenario 1000. Scenario 1000 starts at Instance 4, where Dennis receives an email 1002 from a user named Joe requesting to meet for lunch. At Instance 5, Dennis begins drafting a confirmation email 1004, and the application module 632 inputs Joe's email 1002 into the model execution module 631. A corresponding schedule_meeting intent is predicted by the trained model. Based on the schedule_meeting intent, the application module can trigger an automated action that facilitates scheduling of the event, e.g., by assisting the user in adding a calendar entry to Dennis' calendar, as indicated by add calendar event user interface element 1006 shown in Instance 6.

FIG. 11 illustrates an example scenario 1100. Scenario 1100 starts at Instance 7, where Dennis receives an email 1102 from a user named Reinhard. Dennis begins drafting a confirmation email 1104 at Instance 8, and the application module 632 inputs Reinhard's email 1102 into the model execution module 631. A corresponding promise_action intent is detected by the trained model. Based on the promise_action intent, the application module can trigger an automated action that facilitates adding a task entry to Dennis' task list, as indicated by add task user interface element 1106 shown in Instance 9.

Further Implementations

The examples set forth above are directed to natural language processing applications in a productivity application, e.g., an email context. The examples set forth above are readily extensible to other productivity applications, e.g., word processing, spreadsheets, etc. Furthermore, as discussed more below, the disclosed techniques can be employed in other technology areas to facilitate a broad range of automated actions.

For instance, consider a digital assistant that executes on a personal computing device, such as client device 610 and/or 640 discussed above. The trained model can be used to infer a user's intent responsive to receipt of an utterance, e.g., by performing speech-to-text processing locally or on a server. The digital assistant could then invoke different automated functionality depending on the predicted intent. For instance, a digital assistant may have several different predefined dialogs, a first dialog for assisting the user in making a restaurant reservation, a second dialog for assisting the user in scheduling a flight, and so on. If the user's predicted intent is to make a restaurant reservation, the digital assistant might invoke the first dialog, and if the user's predicted intent is to schedule a flight, the digital assistant might invoke the second dialog. Query refinements or subsequent dialog statements by users can also provide a weak training signal in such contexts.

The disclosed implementations are also suitable for employment in image processing applications. For instance, when a user gives a photo a "like" on a social media platform, this information can be mapped to a corresponding noisy label, e.g., likes can be considered actions that reflect expressions of user sentiment. For instance, a user with a profile indicating that they like cats might "like" a photo or video of a cat. Assume the user might sometimes like pictures of dogs or horses, but much less frequently than pictures or videos of cats. In this case, a "like" from this user can be considered a noisy user action, e.g., can be used as a source of weak supervision for learning an image processing model that discriminates between images or videos of cats, dogs, and horses, in conjunction with another manually-labeled set of images.

As another example, consider a radar application for a fighter aircraft. Here, there might be relatively few manually-labeled instances of radar signatures, e.g., sets of in-phase and quadrature data, recorded during a test when a known enemy aircraft is detected by the radar. There might be many more instances of available radar signature data where it is not certain whether an enemy aircraft was present, but recorded avionics data indicate that the pilot fired a weapon system at the time the radar signature was recorded. Pilots are well-trained and typically tend to fire their weapons at enemy aircraft, but pilots also make mistakes. Thus, an indication that a weapon was fired may be used as a source of weak supervision for training a machine learning model to detect enemy aircraft in radar signatures.

In addition, note that machine-implemented actions can also be used to generate inferred labels for training data. For instance, consider network failures in large data centers. The most frequent cause of a buffer overrun on a particular type of networking device might be a configuration error. However, there may be many other types of low-frequency errors that can also cause the buffer overrun. The disclosed implementations could be employed by having network logs and configuration data analyzed by an expert for relatively few buffer overrun instances, where the expert identifies a specific cause of the buffer overrun, including configuration errors and other errors. This can provide a few explicilty-labeled instances of training data with a strong training signal. To obtain a weak training signal, a larger source of network logs and configuration data associated with other buffer overruns can be assigned an inferred label indicating that the buffer overrun is caused by a configuration error. While this may not be the case for all of the buffer overruns in the second dataset, the weak training signal may aid training a machine learning model to perform automated diagnostics of the network.

Furthermore, the disclosed machine learning structures are examples that can be readily modified to accommodate different technology areas or additional tasks within a given technology area. For instance, while FIG. 1 shows two output layers, e.g., first classification layer 140 and second classification layer 150, further classification layers can be employed for additional datasets with explicit and/or inferred labels. For instance, another classification layer could be trained based on user actions taken in a word processing application, e.g., if users tend to insert graphs after entering specific text strings, this can provide a noisy training signal that can be used to facilitate entering graphs into the word processing application when similar text strings are entered at runtime. In such implementations, intermediate layers such as encoder 130 can be trained using three or more datasets.

Different embedding/encoding layers can be employed for different types of input data. For images or video, a convolutional neural network can be used as an encoding layer to exploit the spatial coherence of pixels. For radio frequency or sonar signals, convolutional and/or long short-term memory networks can be employed. For text, feed-forward neural networks, convolutional neural networks, long short-term memory networks, and transformers can be employed. For example, see the following for background information discussing how different types of neural networks can be employed to obtain suitable representations of input data for subsequent classification: He, et al., "Deep residual learning for image recognition," Proceedings of the IEEE conference on computer vision and pattern recognition, pp. 770-778, 2016, Simonyan et al., "Very deep convolutional networks for large-scale image recognition," arXiv preprint arXiv:1409.1556, 2014, Akeret et al., "Radio frequency interference mitigation using deep convolutional neural networks," Astronomy and computing, Vol. 18, pp. 35-39, 2017, and Nguyen et al., "NLOS identification in WLANs using deep LSTM with CNN features," *Sensors* Vol. 18, No. 11, pp. 4057, 2018.

Device Implementations

As noted above with respect to FIG. 6, system 600 includes several devices, including a client device 610, a server 620, a server 630, and a client device 640. As also noted, not all device implementations can be illustrated, and other device implementations should be apparent to the skilled artisan from the description above and below.

The term "device," "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 650. Without limitation, network(s) 650 can include one or more local area networks (LANs), wide area networks (WANs), the Internet, and the like.

Various examples are described above. Additional examples are described below. One example includes method performed on a computing device, the method comprising: providing a machine learning model having a first classification layer, a second classification layer, and an encoder that feeds into the first classification layer and the second classification layer, obtaining first training examples having explicit labels and second training examples having inferred labels, wherein the inferred labels are based at least on actions associated with the second training examples, training the machine learning model using the first training examples and the second training examples using a training objective, wherein the training objective considers first training loss of the first classification layer for the explicit labels and second training loss of the second classification layer for the inferred labels, and outputting a trained machine learning model having at least the encoder and the first classification layer.

Another example can include any of the above and/or below examples where the method further comprises rectifying the inferred labels to obtain rectified labels, where the second training loss is determined using the rectified labels.

Another example can include any of the above and/or below examples where the training further comprises updating parameters of the first classification layer based at least on the first training loss, updating parameters of the second classification layer based at least on the second training loss, and updating parameters of the encoder based at least on the first training loss and the second training loss.

Another example can include any of the above and/or below examples where further comprising weighting the first training loss relative to the second training loss using a hyperparameter.

Another example can include any of the above and/or below examples where the encoder is configured to map the first training examples and the second training examples into a shared vector space.

Another example can include any of the above and/or below examples where the method further comprises identifying user actions associated with the second training examples and performing inference on the user actions to obtain the inferred labels.

Another example can include any of the above and/or below examples where the first training examples comprise first natural language messages, the explicit labels are selected from an enumerated set of intents, the second training examples comprise second natural language messages, and the inference comprises selecting the inferred labels from the enumerated set of intents based at least on the user actions.

Another example can include any of the above and/or below examples where the user actions are taken in a productivity application responsive to receipt of the second natural language messages.

Another example can include any of the above and/or below examples where the first training examples and the second training examples comprise images or videos.

Another example can include any of the above and/or below examples where the actions reflect expressions of user sentiment for the images or videos.

Another example includes a system comprising a hardware processing unit and a storage resource storing computer-readable instructions which, when executed by the hardware processing unit, cause the hardware processing unit to: receive input data, process the input data using a machine learning model having an encoding layer to obtain a result, at least the encoding layer having been trained to map first training examples having explicit labels and second training examples having inferred labels into a shared vector space, and output the result.

Another example can include any of the above and/or below examples where the machine learning model further comprises a first classification layer that has been trained together with the encoding layer using the explicit labels of the first training examples.

Another example can include any of the above and/or below examples where the machine learning model has been trained using a training objective that considers first training loss of the first classification layer for the explicit labels and second training loss of a second classification layer for the inferred labels.

Another example can include any of the above and/or below examples where the input data comprises a message and the result characterizes an intent of the message.

Another example can include any of the above and/or below examples where the computer-readable instructions, when executed by the hardware processing unit, cause the hardware processing unit to perform an automated action based at least on the intent.

Another example can include any of the above and/or below examples where the intent relates to a user performing a task and the automated action facilitates adding the task to a task list, the intent relates to a request for event scheduling and the automated action facilitates scheduling of the event, and the intent relates to a request for information and the automated action facilitates providing the requested information in response to the request.

Another example includes a method performed on a computing device, the method comprising training an initial iteration of a machine learning model using explicit labels of first training examples and iteratively training subsequent iterations of the machine learning model by inputting instances of second training examples into a current iteration of the machine learning model, selecting a batch of the second training examples for a subsequent training iteration based at least on output of the current iteration, and performing the subsequent training iteration of the machine learning model using inferred labels associated with the selected batch of the second training examples where the iteratively training is performed until a final model is obtained.

Another example can include any of the above and/or below examples where selecting the batch comprises selecting individual second training examples for which the current iteration of the machine learning model has relatively higher confidence than at least some other second training examples.

Another example can include any of the above and/or below examples where the machine learning model comprises a first classification layer trained using the explicit labels, a second classification layer trained using the inferred labels, and an intermediate layer that feeds into the first classification layer and the second classification layer and is trained using both the explicit labels and the inferred labels.

Another example can include any of the above and/or below examples where the first training examples comprise first natural language items, the second training examples comprise second natural language items, and the intermediate layer comprises an encoder that is trained to map the first natural language items and the second natural language items into corresponding embeddings in a vector space.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
    providing a machine learning model having a first classification layer, a second classification layer, and an encoder that feeds into the first classification layer and the second classification layer;
    obtaining first training examples having explicit labels and second training examples having inferred labels, wherein the inferred labels are based at least on actions associated with the second training examples;
    training the machine learning model using the first training examples and the second training examples using a training objective, wherein the training objective considers first training loss of the first classification layer for the explicit labels and second training loss of the second classification layer for the inferred labels; and
    outputting a trained machine learning model having at least the encoder and the first classification layer, wherein the encoder is configured to map the first training examples and the second training examples into a shared vector space.

2. The method of claim 1, further comprising:
rectifying the inferred labels to obtain rectified labels,
wherein the second training loss is determined using the rectified labels.

3. The method of claim 1, wherein the training comprises:
updating parameters of the first classification layer based at least on the first training loss;
updating parameters of the second classification layer based at least on the second training loss; and
updating parameters of the encoder based at least on the first training loss and the second training loss.

4. The method of claim 3, further comprising:
weighting the first training loss relative to the second training loss using a hyperparameter.

5. The method of claim 1, further comprising:
identifying user actions associated with the second training examples; and
performing inference on the user actions to obtain the inferred labels.

6. The method of claim 5, wherein the first training examples comprise first natural language messages, the explicit labels are selected from an enumerated set of intents, the second training examples comprise second natural language messages, and the inference comprises selecting the inferred labels from the enumerated set of intents based at least on the user actions.

7. The method of claim 6, wherein the user actions are taken in a productivity application responsive to receipt of the second natural language messages.

8. The method of claim 1, wherein the first training examples and the second training examples comprise images or videos.

9. The method of claim 8, wherein the actions reflect expressions of user sentiment for the images or videos and the encoder is a convolutional encoder.

10. The method of claim 1, wherein the trained machine learning model that is output does not include the second classification layer.

11. A system comprising:
a hardware processing unit; and
a storage resource storing computer-readable instructions which, when executed by the hardware processing unit, cause the hardware processing unit to:
provide a machine learning model having a first classification layer, a second classification layer, and an encoder that feeds into the first classification layer and the second classification layer;
obtain first training examples having explicit labels and second training examples having inferred labels, wherein the inferred labels are based at least on actions associated with the second training examples;
train the machine learning model using the first training examples and the second training examples using a training objective, wherein the training objective considers first training loss of the first classification layer for the explicit labels and second training loss of the second classification layer for the inferred labels; and
output a trained machine learning model having at least the encoder and the first classification layer,
wherein the encoder is configured to map the first training examples and the second training examples into a shared vector space.

12. The system of claim 11, wherein the trained machine learning model that is output does not include the second classification layer.

13. The system of claim 11, wherein the computer-readable instructions, when executed by the hardware processing unit, cause the hardware processing unit to:
train the first classification layer and the encoder for one or more initial training iterations using the first training examples; and
iteratively train the second classification layer and the encoder for subsequent training iterations using the second training examples.

14. The system of claim 13, wherein the computer-readable instructions, when executed by the hardware processing unit, cause the hardware processing unit to:
perform the subsequent training iterations by:
inputting instances of the second training examples into a current model iteration of the machine learning model;
selecting a batch of the second training examples for a next subsequent training iteration based at least on output of the current model iteration; and
performing the next subsequent training iteration using inferred labels associated with the selected batch of the second training examples.

15. The system of claim 14, wherein the computer-readable instructions, when executed by the hardware processing unit, cause the hardware processing unit to:
perform the subsequent training iterations until a final model is obtained.

16. The system of claim 15, wherein the computer-readable instructions, when executed by the hardware processing unit, cause the hardware processing unit to:
select, for the subsequent training iteration, individual second training examples for which the current model iteration has relatively higher confidence than at least some other remaining second training examples.

17. The system of claim 16, wherein all of the individual second training examples selected for the subsequent training iteration have higher confidence than all of the remaining second training examples.

18. The system of claim 17, wherein the first training examples comprise first natural language items, the second training examples comprise second natural language items, and the encoder is trained to map the first natural language items and the second natural language items into corresponding embeddings in the shared vector space.

19. The system of claim 18, wherein the encoder is a transformer encoder.

20. A computer-readable storage medium storing computer-readable instructions which, when executed by a hardware processing unit, cause the hardware processing unit to:
provide a machine learning model having a first classification layer, a second classification layer, and an encoder that feeds into the first classification layer and the second classification layer;
obtain first training examples having explicit labels and second training examples having inferred labels, wherein the inferred labels are based at least on actions associated with the second training examples;
train the machine learning model using the first training examples and the second training examples using a training objective, wherein the training objective considers first training loss of the first classification layer for the explicit labels and second training loss of the second classification layer for the inferred labels; and output a trained machine learning model having at least the encoder and the first classification layer,
wherein the encoder is configured to map the first training examples and the second training examples into a shared vector space.

* * * * *